United States Patent
Minota et al.

(10) Patent No.: US 7,317,862 B2
(45) Date of Patent: Jan. 8, 2008

(54) MECHANISM FOR RELEASING LOCK BETWEEN OPTICAL TRANSCEIVER AND CAGE, OPTICAL TRANSCEIVER, COMMUNICATION APPARATUS AND METHOD OF RELEASING LOCK BETWEEN OPTICAL TRANSCEIVER AND CAGE

(75) Inventors: Yuji Minota, Tokyo (JP); Naoki Kitamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/103,120

(22) Filed: Apr. 11, 2005

(65) Prior Publication Data

US 2005/0226587 A1    Oct. 13, 2005

(30) Foreign Application Priority Data

Apr. 13, 2004  (JP) .............................. 2004/118008
May 25, 2004  (JP) .............................. 2004/154622

(51) Int. Cl.
   *G02B 6/36* (2006.01)
(52) U.S. Cl. .................... 385/134; 385/53; 385/76; 385/88; 439/372; 439/152; 439/544
(58) Field of Classification Search ............... 439/372, 439/544, 152; 385/92, 76, 53, 134, 88; 361/728
See application file for complete search history.

(56) References Cited

U.S. PATENT DOCUMENTS

| | | | |
|---|---|---|---|
| 6,430,053 B1 | 8/2002 | Peterson et al. | |
| 6,439,918 B1* | 8/2002 | Togami et al. | 439/372 |
| 6,494,623 B1* | 12/2002 | Ahrens et al. | 385/76 |
| 6,533,603 B1* | 3/2003 | Togami | 439/372 |
| 6,746,158 B2* | 6/2004 | Merrick | 385/53 |
| 6,771,511 B2* | 8/2004 | Bui | 361/728 |
| 6,789,958 B2* | 9/2004 | Ahrens et al. | 385/92 |
| 6,830,385 B2* | 12/2004 | Ishigami et al. | 385/92 |
| 6,887,092 B2* | 5/2005 | Minota | 439/372 |
| 6,935,882 B2* | 8/2005 | Hanley et al. | 439/372 |
| 6,945,809 B2* | 9/2005 | Ishigami et al. | 439/372 |
| 2003/0156801 A1 | 8/2003 | Hwang | |
| 2003/0194190 A1 | 10/2003 | Huang | |
| 2003/0198026 A1 | 10/2003 | Bui | |
| 2003/0228799 A1 | 12/2003 | Machado et al. | |
| 2004/0062493 A1 | 4/2004 | Ishigami et al. | |

FOREIGN PATENT DOCUMENTS

| | | |
|---|---|---|
| JP | 1-162945 | 11/1989 |
| JP | 2-10153 | 1/1990 |

* cited by examiner

*Primary Examiner*—Frank G. Font
*Assistant Examiner*—Guy G Anderson
(74) *Attorney, Agent, or Firm*—Scully, Scott, Murphy, Presser, P.C.

(57) ABSTRACT

If a user pushes an operating member 50 in a state in which a case 11 of an optical transceiver 1 is locked in a cage 2, a lever 22 is turned to the front of the optical transceiver 1. If the user pulls out the turned lever 22, a projection provided on an actuating piece 28 abuts a convex portion 35 so that an end of the actuating piece 28 projects below the case 11. If a plate spring portion 18 of the cage 2 is pressed and elastically displaced by the end of the actuating piece 28, a lock portion 17 of the case 11 comes off a locking hole 19 of the plate spring portion 18, and the optical transceiver 1 can be pulled out of the cage 2.

45 Claims, 40 Drawing Sheets

(A-A)

MECHANISM FOR RELEASING LOCK BETWEEN OPTICAL TRANSCEIVER AND CAGE, OPTICAL TRANSCEIVER, COMMUNICATION APPARATUS AND METHOD OF RELEASING LOCK BETWEEN OPTICAL TRANSCEIVER AND CAGE

BACKGROUND OF THE INVENTION

1. Field of the Invention

The present invention relates to a structure of an optical transceiver for performing optical communication. In particular, the present invention relates to a mechanism which releases a lock between a case of the optical transceiver and a cage for accommodating the case.

2. Description of the Related Art

As for a conventional optical module, there is an optical transceiver comprising a light-emitting element and a light-sensitive element for performing communication by means of an optical fiber and performing photoelectric conversion. This kind of optical transceiver has an optical unit including the light-emitting element and light-sensitive element built into a case, and this case is detachably inserted into a cage provided on a board such as printed circuit board (PCB). An electrical connector connected to the board is provided in the cage. If the case of the optical transceiver is inserted in the cage, a joining terminal of the optical transceiver is connected to the electrical connector provided in the cage. The optical transceiver converts an electrical signal received from the board to an optical signal and sends it to the optical fiber and also converts the optical signal received from the optical fiber to the electrical signal and outputs it to the board. Thus, the optical transceiver converts the optical signal and electrical signal mutually so as to allow optical communication.

The optical transceiver detachably inserted in the cage must be securely fixed in the cage. This is because, if the optical transceiver comes off the cage during operation, not only the communication is disrupted but a communication apparatus including the optical transceiver may also break down. For this reason, the case for this kind of optical transceiver has a lock mechanism for locking it in the cage.

As for the optical transceiver detachable from the cage, compatibility was required among products of various manufacturers so that the optical transceiver can be replaced easily with a spare optical transceiver if it breaks down. If the products of the manufacturers are compatible, therefore the user can procure the spare parts easily and inexpensively from abundant alternatives without being limited to the products of a specific manufacturer.

Consequently, to establish the compatibility among the optical transceivers provided from the manufacturers, an industry standards body established a standard called Multi Source Agreement (MSA) regarding a Small Form-factor Pluggable (SFP) transceiver as a kind of optical transceiver. The MSA standard prescribes forms and dimensions as to the SFP transceiver and the cage for inserting the SFP transceiver therein. According to the MSA standard, a projecting lock portion is provided on a bottom face of the SFP transceiver, and a plate spring portion having a locking hole for locking the lock portion formed thereon is provided on the cage. Therefore, if the SFP transceiver is inserted in the cage, the lock portion of the SFP transceiver is locked in the locking hole provided on the cage so as to lock the SFP transceiver in the cage.

When pulling the SFP transceiver out of the cage, means for releasing the lock is necessary. A method of releasing the lock between the optical transceiver and the cage is disclosed in U.S. Pat. No. 6,439,918. This will be described by using FIGS. 1 and 2.

FIG. 1 is a sectional side view of a conventional transceiver locked in the cage. In FIG. 1, a lock member 1104 provided to a case 1101 has a lock portion 1104a locked in a locking hole 1110a formed on a cage 1110, and is swingable centering on a spindle 1105. If the user turns a lever 1103 on a rotary axis 1103a in an arrow direction, the lock member 1104 coupled to the lever 1103 swings centering on the spindle 1105 so that the lock portion 1104a goes up. The lock portion 1104a comes off the locking hole 110a of the cage 1110 so as to release the lock between the optical transceiver and the cage. FIG. 2 shows a state in which the lock between the optical transceiver and the cage is released. In FIG. 2, if the user pulls the lever 1103 in the arrow direction, the case 1101 of the optical transceiver is detached from the cage 1110.

FIGS. 3A and 3B show an example of mounting multiple optical transceivers in the communication apparatus. Such an example of mounting was developed while almost all the apparatuses including the communication apparatuses were miniaturized and the optical transceivers provided in the communication apparatuses were also miniaturized and rendered high-density in recent years.

FIG. 3A is a perspective view showing a part of a conventional communication apparatus on which multiple optical transceivers are mountable. In FIG. 3A, multiple cages 1110 for mounting the optical transceivers are provided for the sake of allowing the multiple optical transceivers to be provided being mutually adjacent on the left, right, top and bottom in the communication apparatus. There are also multiple boards 1120 piled up vertically for mounting the multiple cages 1110. An opening of each cage 1110 is aligned with a slot 1130a provided on a panel 1130, and the case 1101 of the optical transceiver is inserted in the cage 1110 through the slot 1130a.

FIG. 3B shows a state in which the multiple optical transceivers are mounted on the communication apparatus of FIG. 3A. In FIG. 3B, the user cannot insert his or her finger between an upper optical transceiver and a lower optical transceiver vertically and adjacently placed. Therefore, the user cannot place his or her finger on the lever 1103 of the optical transceiver and pull it forward. It is not possible, however, to mount the optical transceivers at a high density in the communication apparatus if they are arranged to allow the user to place his or her finger between the upper and lower optical transceivers.

Incidentally, Other mechanisms for releasing the lock will be described by using FIGS. 4A to 5.

FIGS. 4A and 4B are a partially sectional view and a perspective view showing a connector-detachable mechanism disclosed in Japanese Utility Model Laid-Open No. 1-162945 respectively. FIG. 4A shows a state in which a case 2001 is accommodated in a mounting hardware 2004.

If the user turns a handle 2002 and pulls it to the front of the case 2001 from the state of FIG. 4A, the case 2001 is pulled out of the mounting hardware 2004, and a first connector 2005 is set apart from a second connector 2006. FIG. 4B shows this state.

FIG. 5 is a perspective view showing the lock mechanism of an electronic device disclosed in Japanese Utility Model Laid-Open No. 2-10153. An electronic device 3001 is an in-car electronic device such as a car stereo, which is locked onto a vehicle body not shown.

In FIG. 5, if the user pushes a lock release button 3002, the lock of the electronic device 3001 onto the vehicle body is released, and a handle pressing lever 3023 turns centering on a support 3024 so that a press portion 3023a pushes out a handle 3012 to the front of the electronic device 3001. If the user pulls the pushed-out handle 3012, the electronic device 3001 is pulled out of the vehicle body.

SUMMARY OF THE INVENTION

An object of the present invention is to provide an optical transceiver for improving operability for a user.

Another object is to provide the optical transceiver to be mounted at a high density and easily pulled out by the user.

To attain the objects, a mechanism for releasing a lock between the optical transceiver and a cage of the present invention includes a lever mounted on the optical transceiver and turning centering on a predetermined axis, an operating member for working with and turning the lever, and a lock release mechanism for releasing the lock by operating the operating member to turn and move the lever from a first position to a second position. The operating member should desirably turn the lever by pressing it. The operating member should desirably be mounted on the lever. It should desirably be mounted almost vertically on the lever. It is also desirable that the operating member exist below the optical transceiver in a state in which the lever is turned. It is also possible to have the operating member and the lever integrally formed. It is also desirable that the operating member turns the lever by pulling. The operating member should desirably be mounted on the lever. The operating member may be rotatably mounted on the lever. It should desirably have a plate spring portion formed on a predetermined face of the cage and a locking hole provided on the plate spring portion. It should desirably have a concave portion formed on a predetermined face of the optical transceiver and a lock portion provided on the concave portion, and the lock release mechanism should desirably release the lock between the lock portion and the locking hole by moving. It should desirably have a slide member mounted on the lever, at least partially accommodated in the concave portion and sliding along with the move. It should desirably have a first convex portion formed on the concave portion and a second convex portion provided on the slide member so that the move of the lever causes the first and second convex portions to abut and elastic displacement of the plate spring portion due to the abutting releases the lock between the lock portion and the locking hole. It is also possible to have the slide member for being swung centering on the predetermined axis by turning of the lever and sliding along with the move and the lock portion formed on one face of the slide member. The lock release mechanism can have the lock between the lock portion and the locking hole released by swinging of the slide member.

The optical transceiver for releasing the lock with the cage of the present invention includes the lever for turning centering on a predetermined axis, the operating member for working with and turning the lever, and the lock release mechanism for releasing the lock by operating the operating member to turn and move the lever from the first position to the second position. The operating member should desirably turn the lever by pressing it. The operating member may turn the lever by pulling. It should desirably have the concave portion formed on the predetermined face, the first convex portion formed on the concave portion, the slide member mounted on the lever, at least partially accommodated in the concave portion and sliding along with the move and the second convex portion provided on the slide member so that the lock release mechanism releases the lock by having the first and second convex portions abutted by the move of the lever. It is also possible that the lock release mechanism of present invention having the slide member for being swung centering on the predetermined axis by turning of the lever and sliding along with the move can have the lock released by the swinging of the slide member.

A communication apparatus of the present invention including a board having at least one cage mounted thereon with the optical transceiver locked in the cage of the present invention includes the lever mounted on the optical transceiver and turning centering on the predetermined axis, the operating member for working with and turning the lever, and the lock release mechanism for releasing the lock between the optical transceiver and the cage by operating the operating member to turn and move the lever from the first position to the second position.

A method of releasing the lock between the optical transceiver and the cage of the present invention includes steps of operating the operating member provided to the optical transceiver, working with operation of the operating member and turning the lever, and releasing the lock by moving the lever to the predetermined position. It is also desirable that the operating step comprises pressing the operating member provided on the optical transceiver. The operating step may also pull the operating member provided on the optical transceiver. It is desirable that the step of releasing the lock including the steps of: causing the convex portion formed on the slide member and sliding along with the move of the lever to abut the convex portion formed on the predetermined face of the optical transceiver; and elastically displacing the plate spring portion formed on the predetermined face of the cage should desirably release the lock between the lock portion formed on the predetermined face and the locking hole provided on the plate spring portion. It is desirable that the step of releasing the lock including the step of swinging the slide member mounted on the lever centering on the predetermined axis should desirably release the lock between the lock portion formed on the slide member and the locking hole provided on the cage.

Therefore, according to the present invention, the user turns a lever 22 and pulls the turned lever 22 and thereby easily and securely releases the lock between a case 11 and a cage 2 so that the operability for the user can be improved.

According to the present invention, the user presses a press portion 51 of an operating member 50 to turn the lever 22, and pulls the turned lever 22 to release the lock between the case 11 and cage 2 so that the user can easily pull the optical transceiver out of the cage 2 even if the optical transceivers are mounted at a high density.

BRIEF DESCRIPTION OF THE DRAWINGS

These and other objects, features and advantages of the invention will become more fully apparent from the following detailed description taken in conjunction with accompanying drawings.

DETAILED DESCRIPTION OF THE PREFERRED EMBODIMENTS

Figure 1:
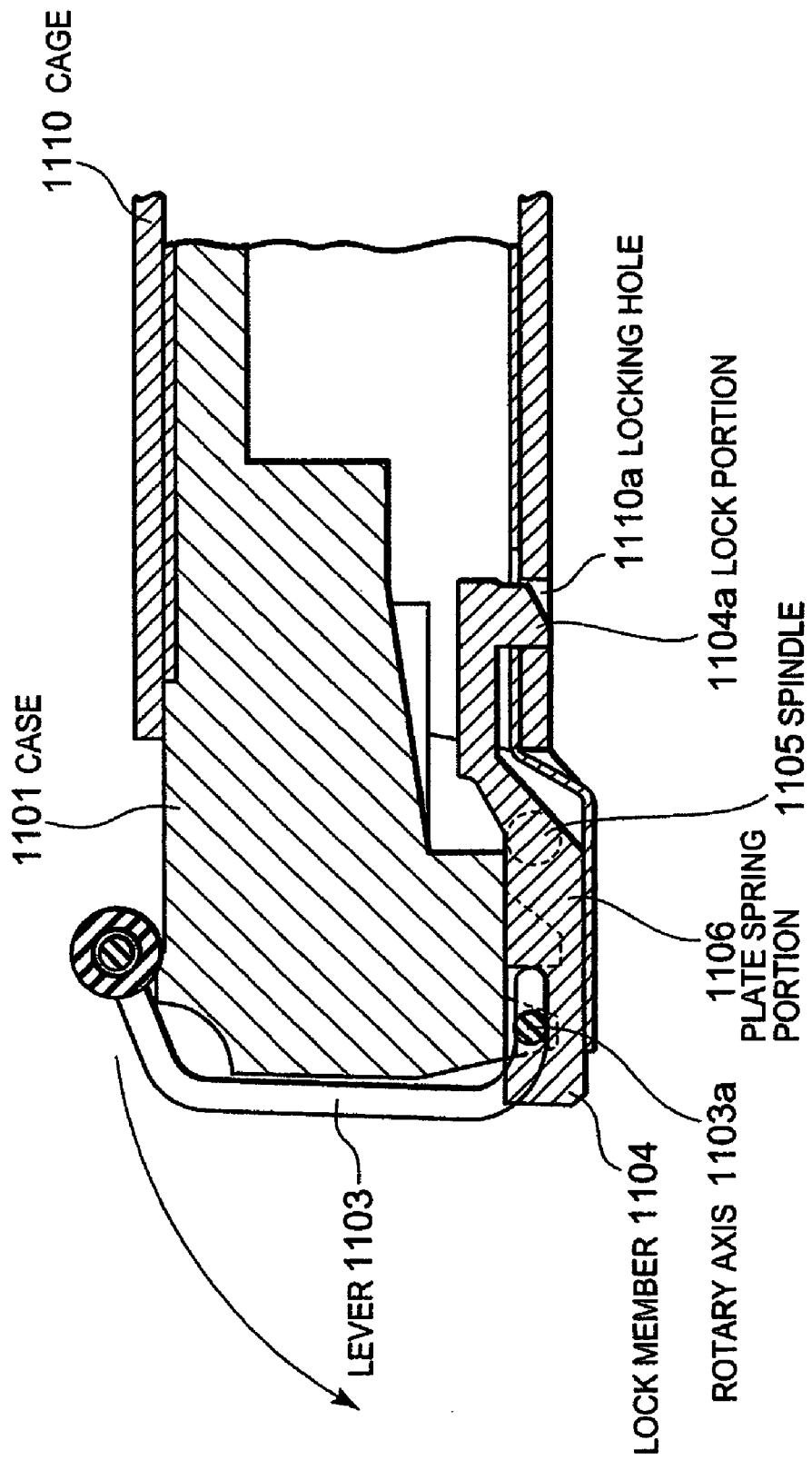
FIG. 1 is a sectional side view of a conventional optical transceiver locked in a cage.
Figure 2:
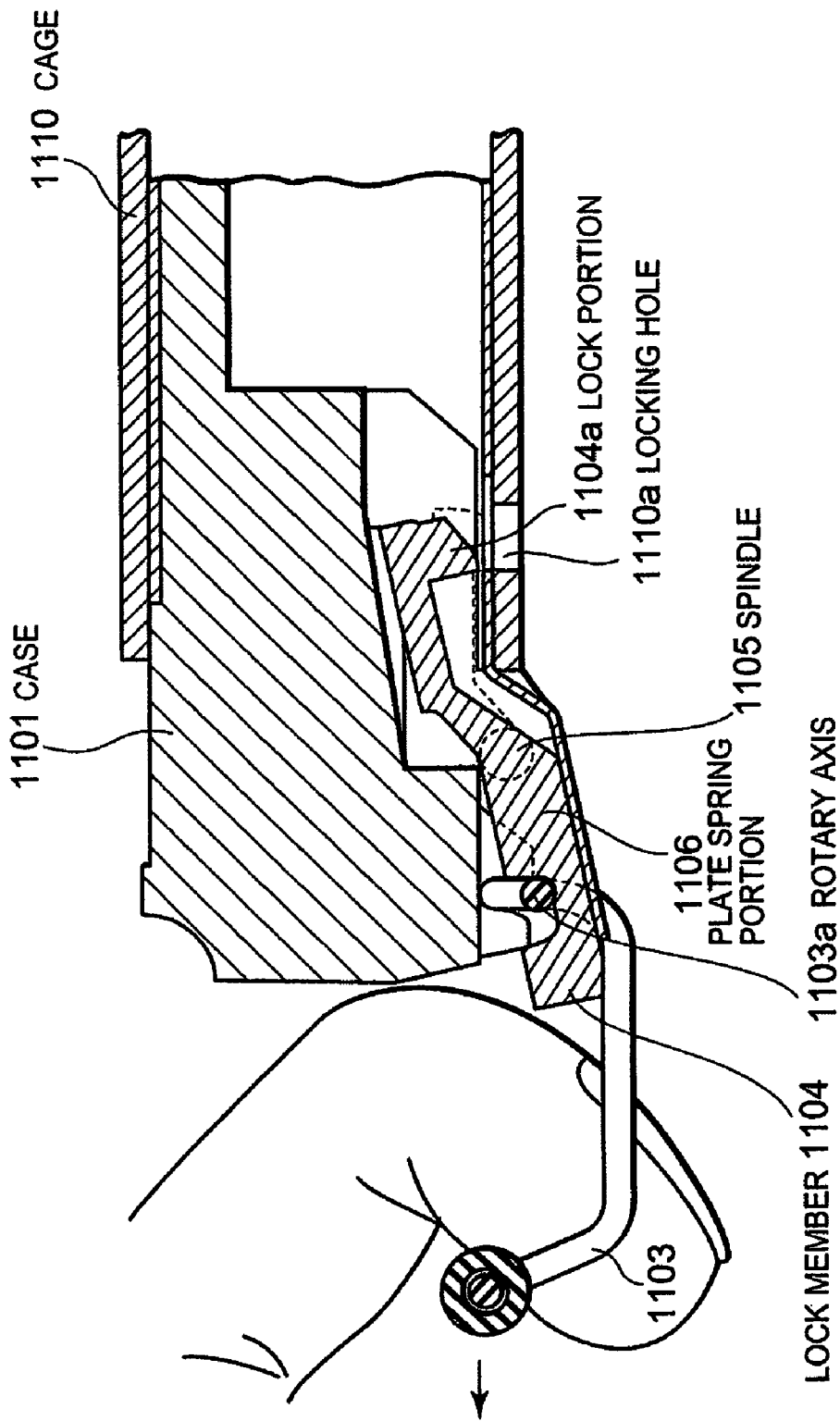
FIG. 2 is a sectional side view of the optical transceiver showing a state in which the lock between the optical transceiver and the cage of FIG. 1 is released.
Figure 3A:
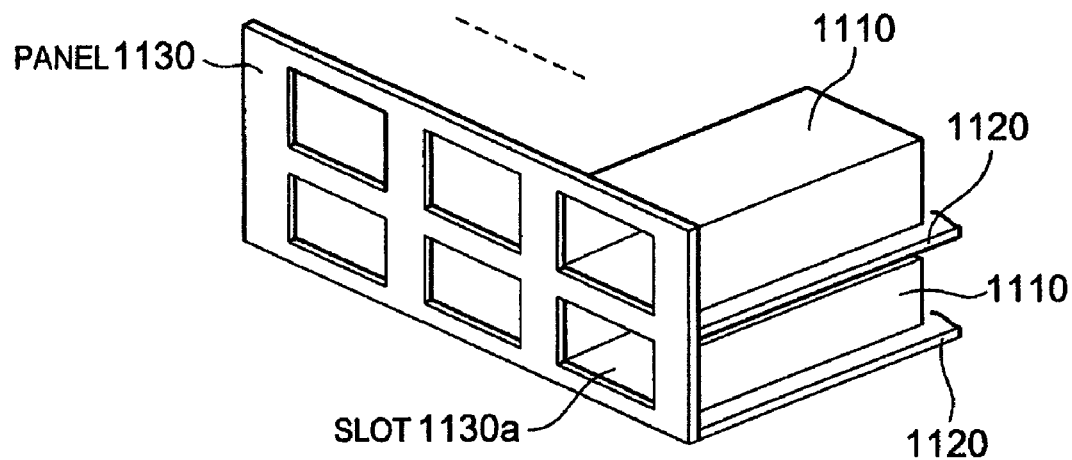
FIG. 3A is a perspective view showing a part of a conventional communication apparatus on which multiple optical transceivers are mountable.
Figure 3B:
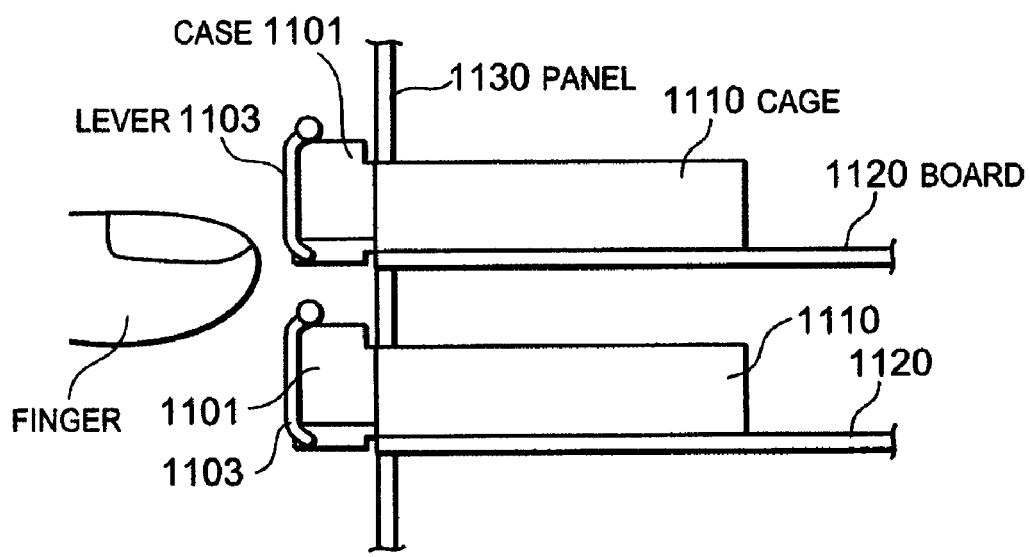
FIG. 3B shows a state in which the multiple optical transceivers are inserted in the communication apparatus of FIG. 3A.

Embodiments of the present invention will be described by referring to the drawings. According to the present invention, an optical transceiver 1 refers to the one having at least a case 11, a lever 22, a slide member 21 and an operating member 50.

Figure 6A:
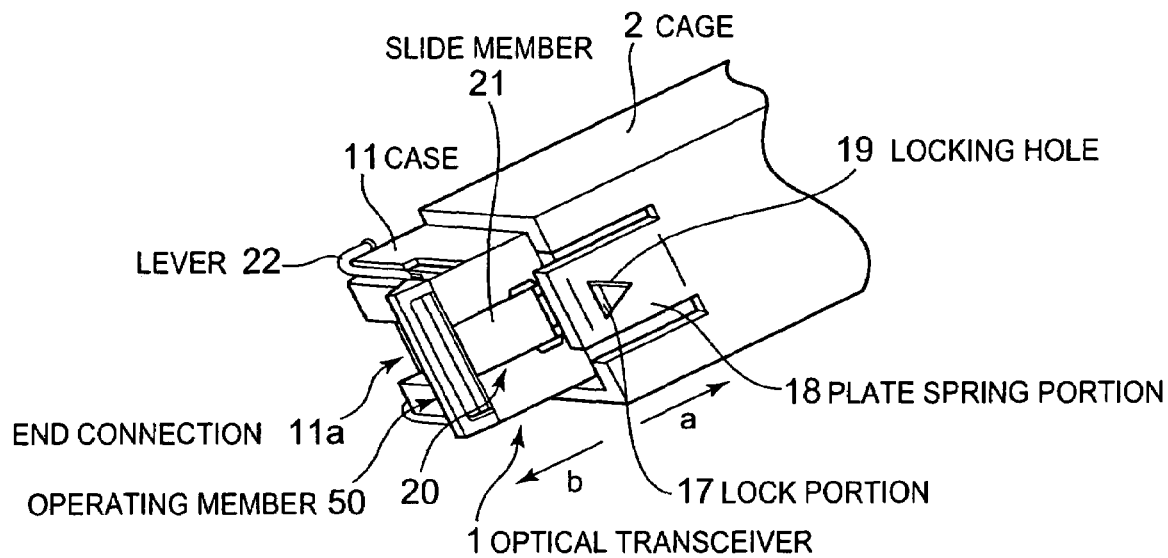
FIG. 6A is a perspective view showing a state in which an optical transceiver 1 as a first embodiment of the present invention is inserted in a cage 2.
Figure 6B:
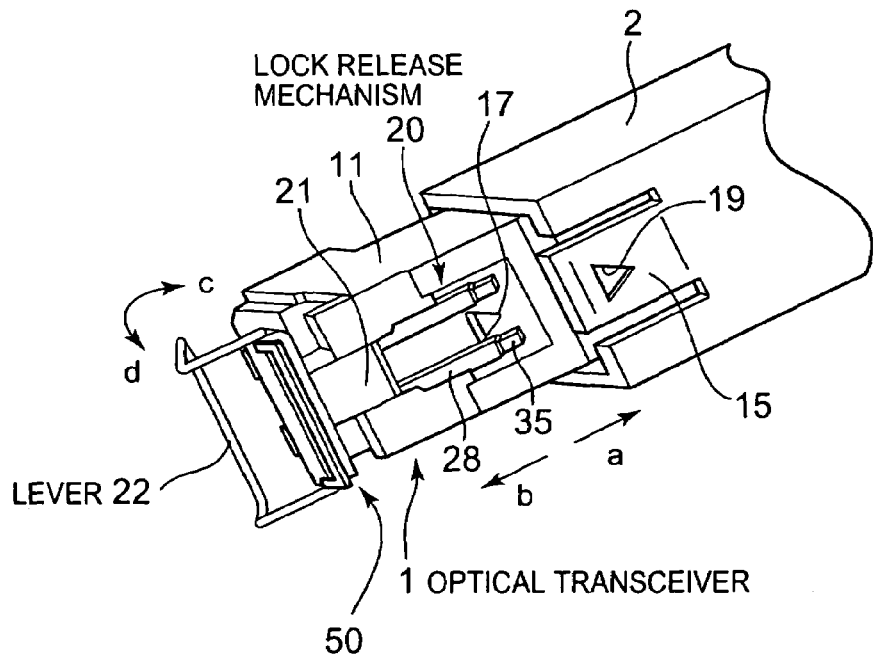
FIG. 6B is a perspective view showing a state in which the optical transceiver 1 as the first embodiment of the present invention is pulled out of the cage 2.

FIG. 6A is a perspective view showing a state in which the optical transceiver 1 as a first embodiment of the present invention is inserted in a cage 2. FIG. 6B is a perspective view showing a state in which the optical transceiver 1 as the first embodiment of the present invention is pulled out of the cage 2. In FIGS. 6A and 6B, the case 11 of the optical transceiver 1 is configured to be detachable from the cage 2 provided on a board such as a mother board not shown provided to communication apparatus for instance. And when the case 11 of the optical transceiver 1 is completely inserted in the cage 2, it is in a locked state being locked in the cage 2.

The case 11 of the optical transceiver 1 has a lock portion 17 to be locked on the cage 2. The cage 2 has a triangular locking hole 19 for having the lock portion 17 inserted therein. The locking hole 19 is provided on a plate spring portion 18 formed to be capable of elastic displacement.

A lock release mechanism 20 is a mechanism for releasing a lock between the lock portion 17 of the case 11 and the locking hole 19 of the cage 2, and is comprised of the slide member 21, lever 22 and a spindle 23 described later. The slide member 21 is movably supported against the case 11, and functions as a lock release member for releasing the lock between the lock portion 17 of the case 11 and the locking hole 19 of the cage 2. The lever 22 is provided on a front end face of the case 11, and is formed to be rotatable in directions of arrows c or d. The lever 22 is used to move the slide member 21 in the directions of arrows a or b.

The operating member 50 is firmly fixed beneath the lever 22. If a user pushes the operating member 50 with his or her finger without placing his or her finger on the lever 22, the lever 22 is turned in the directions of arrows d. Details of structure and functions of the operating member 50 will be described later.

The case 11 of the optical transceiver 1 has various unshown optical elements which are communication means used for optical communication built therein. For instance, it includes an optical unit having optical elements such as a Laser Diode (LD) as a light-emitting element, a Photo Diode (PD) as a light-sensitive element or a lens. An end connection 11a is formed astride the front end face and a ceiling face of the case 11, and a connector plug of an optical fiber cable not shown is detachably connected to the end connection 11a.

The cage 2 and case 11 are configured, for instance, by bending a metal plate such as stainless used steel (SUS). The case 11 is configured with a mold-formed resin such as Poly Phenylene Sulphide (PPS) for instance.

Figure 7A:
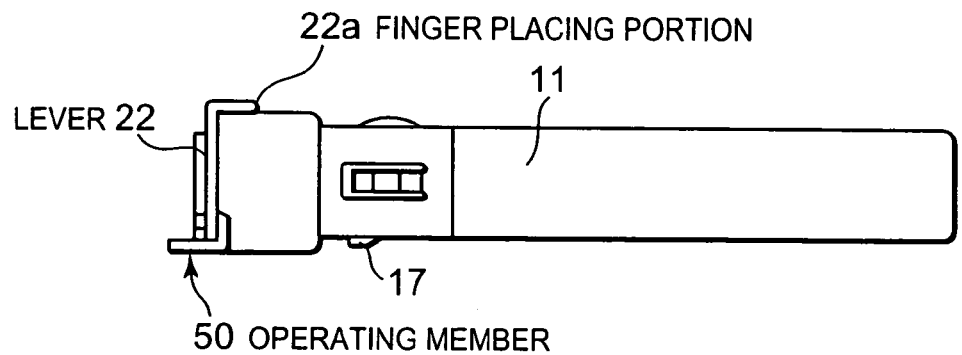
FIGS. 7A and 7B are a side view and a bottom view of the optical transceiver 1 shown in FIG. 6A respectively.
Figure 7B:
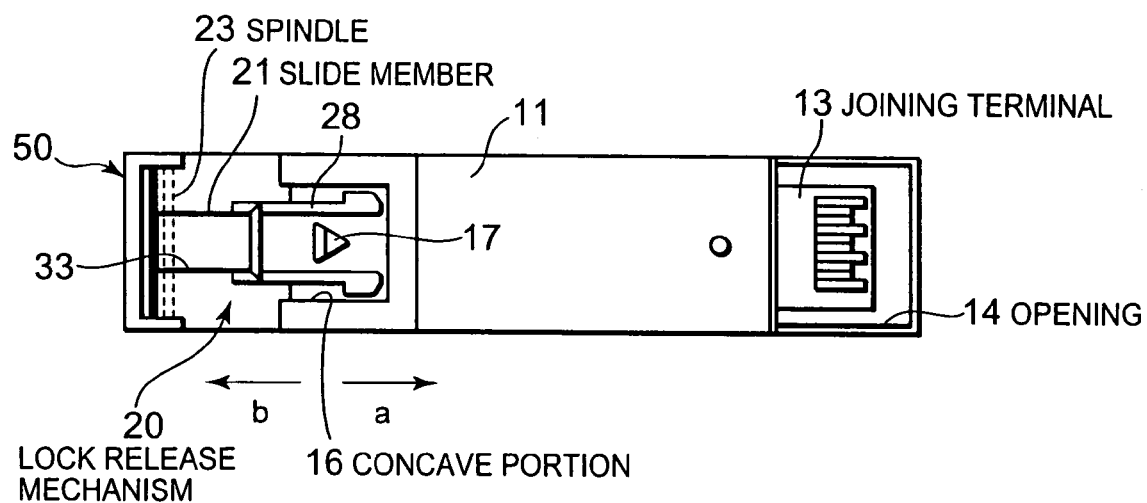

FIGS. 7A and 7B are a side view and a bottom view of the optical transceiver 1 shown in FIG. 6A respectively. In FIG. 7A, a finger placing portion 22a for the user to place his or her finger is formed in an upper portion of the lever 22. The operating member 50 is mounted almost vertically on the lever 22. In FIG. 7B, an opening 14 is formed on a bottom face on a back end side of the case 11 in order to expose a joining terminal 13 connected to an electrical connector provided on a board not shown. The spindle 23 has its both ends supported by an unshown shaft hole provided on the case 11 while supporting the slide member 21 movably in the directions of the arrows a or b.

Figure 8A:
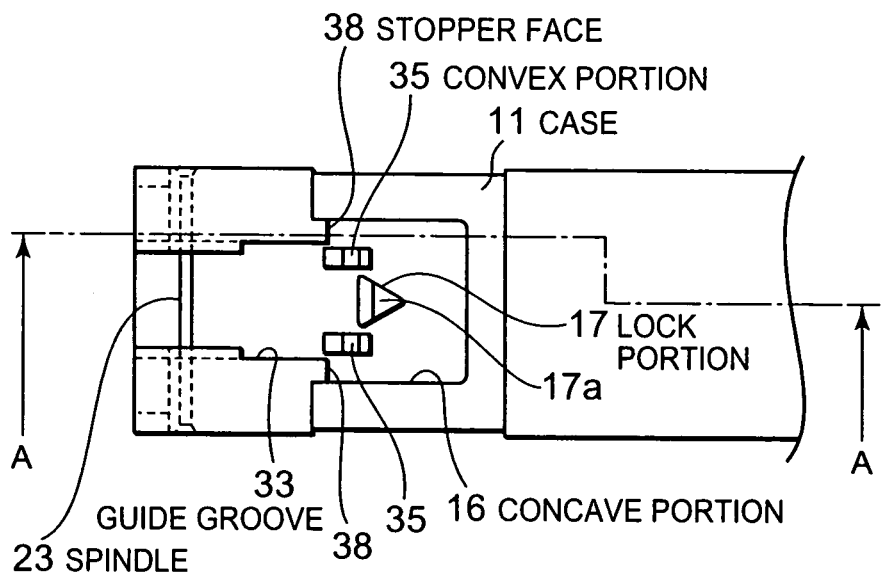
FIGS. 8A and 8B are a bottom view and a side view of a case 11 shown in FIGS. 6A and 6B respectively.
Figure 8B:
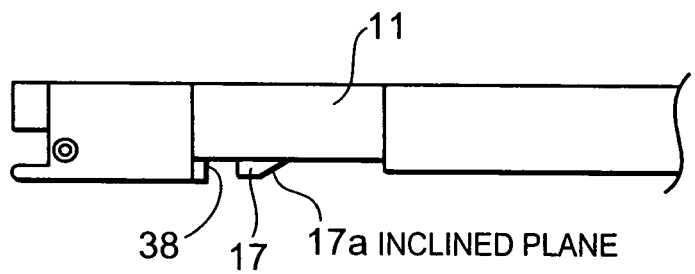
Figure 8C:
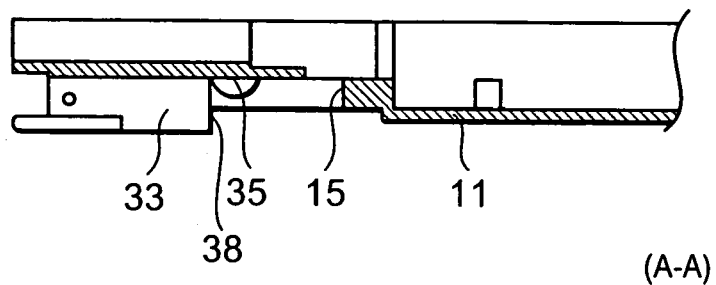
FIG. 8C is an A to A sectional view of FIG. 8A.

FIGS. 8A and 8B are a bottom view and a side view of the case 11 shown in FIGS. 6A and 6B respectively. FIG. 8C is an A to A sectional view of FIG. 8A.

In FIGS. 8A to 8C, the triangular and projecting lock portion 17 is formed in a concave portion 16 provided on the bottom face of the case 11. The lock portion 17 has an inclined plane 17a formed on an approach end side on which the case 11 approaches the cage 2. The inclined plane 17a is formed so that projection height from the bottom face in the concave portion 16 becomes gradually higher as the case 11 gets inserted in the cage 2.

On the bottom face of the concave portion 16, approximately trapezoidal convex portions 35 to be engaged with projections 34 of actuating pieces 28 described later are placed in opposed positions sandwiching the lock portion 17.

On the bottom face of the case 11, a guide groove 33 for guiding the slide member 21 in a moving direction is provided. As the slide member 21 is slid along the opposed side faces of the guide groove 33, relative positions of the actuating pieces 28 against the case 11 are decided. Depth of the guide groove 33 is almost equal to thickness of the slide member 21 so as not to project the slide member 21 from the bottom face of the case 11.

The case 11 has a stopper face 38 for regulating the move of the slide member 21 notched and formed at a position adjacent to the guide groove 33. The stopper face 38 is formed by making a sharp angle to the side face of the guide groove 33. Therefore, the slide member 21 is prevented from dropping out of the case 11 because, when moved to the case 11 in the arrow b direction of FIG. 6A, a retaining face 37 of each actuating piece 28 described later hits the stopper face 38 to regulate the move of the slide member 21.

Figure 9:
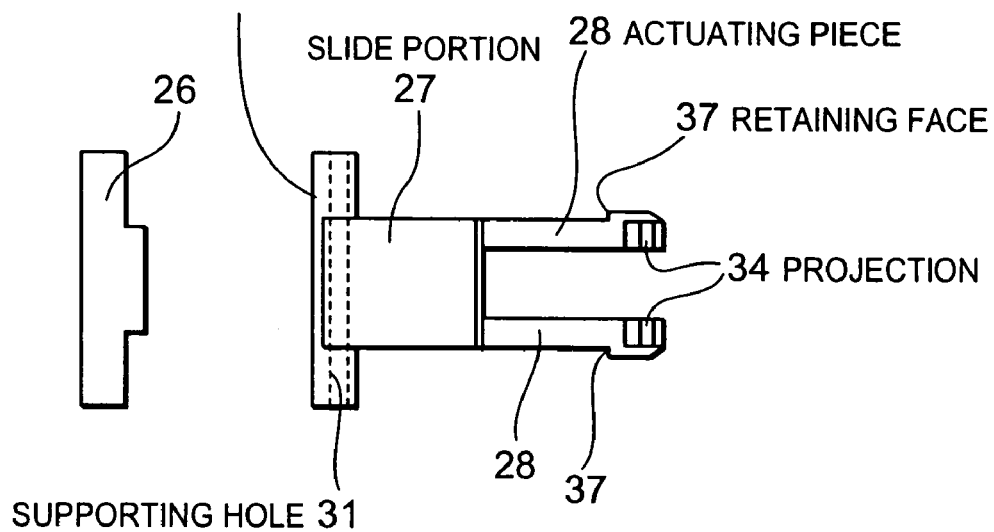
FIG. 9 is three-sided views showing structure of a slide member 21 from the top, side and front.
Figure 9:
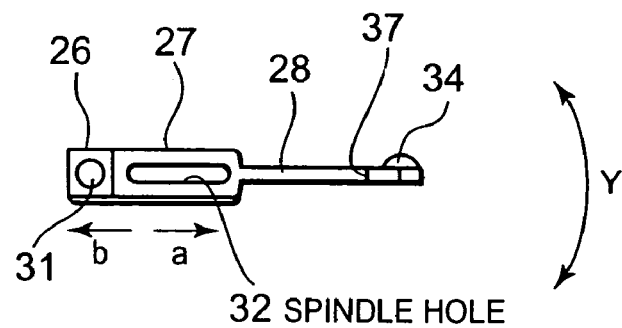

FIG. 9 is three-sided views showing structure of a slide member 21 from the top, side and front. The slide member 21 is comprised of a rear anchor portion 26, a slide portion 27 and actuating pieces 28 which are integrally formed.

Figure 4A:
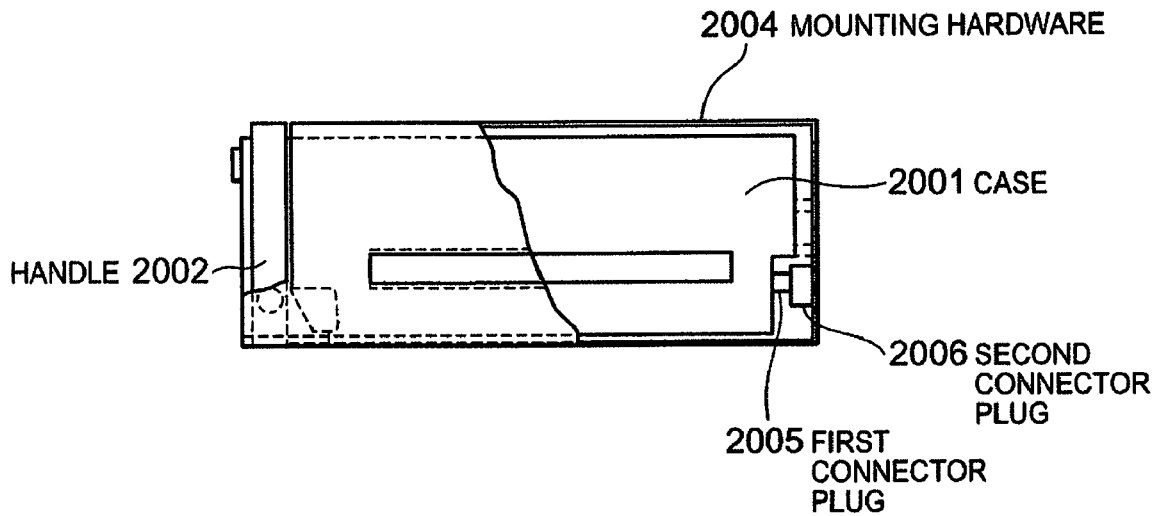
FIGS. 4A and 4B are a partially sectional view and a perspective view showing a connector-detachable mechanism respectively.
Figure 4B:
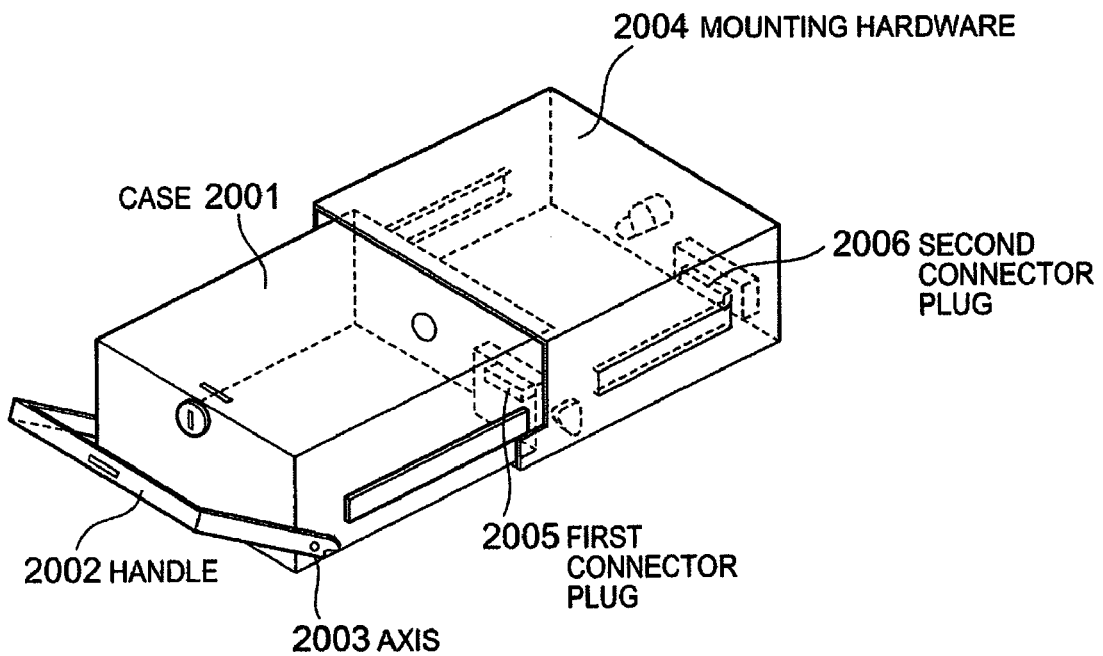
Figure 5:
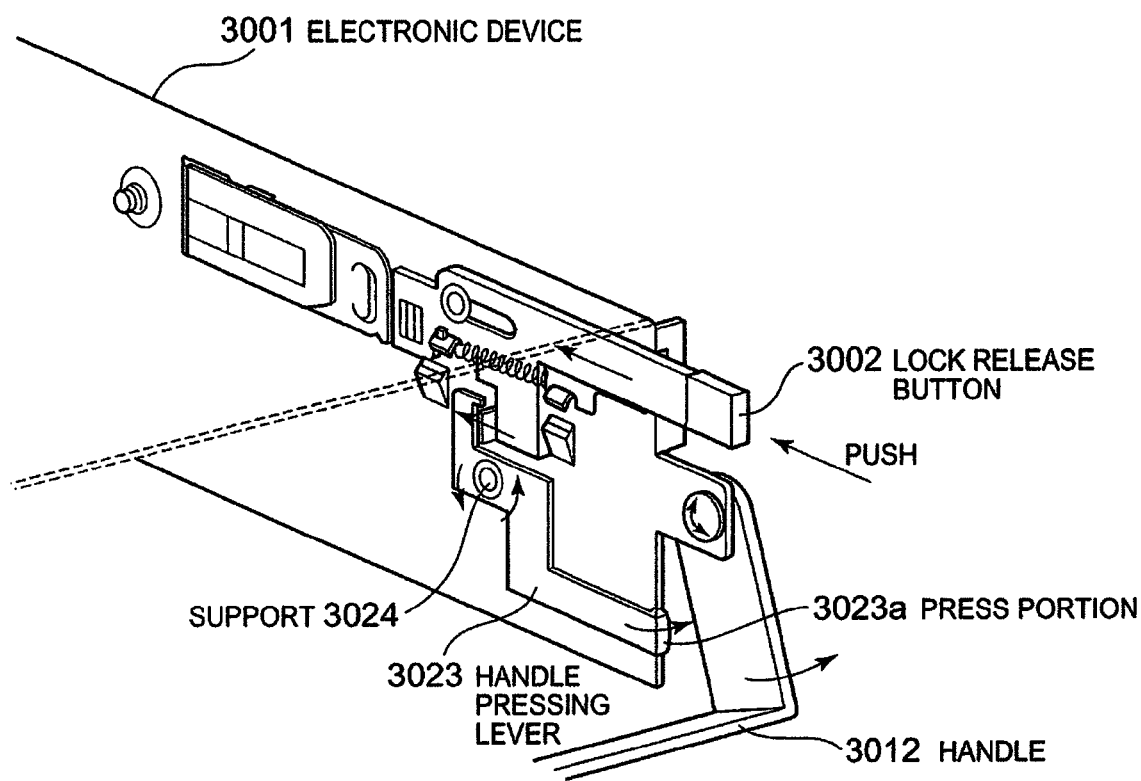
FIG. 5 is a perspective view showing a lock mechanism of an electronic device.

The rear anchor portion 26 has a supporting hole 31 orthogonal to the moving direction of the slide member 21 (the arrow a or b direction of FIG. 4A) and having a predetermined width parallel to the bottom face of the case 11. The supporting hole 31 rotatably supports the lever 22.

The slide portion 27 has a spindle hole 32 like an elongate hole in which the spindle 23 shown in FIG. 7B is movably inserted in the arrow a or b direction. The slide member 21 is formed with a resin material such as PPS or an elastic metal for instance.

Two actuating pieces 28 are formed with a predetermined interval not to collide with the lock portion 17 of the case 11 shown in FIG. 6B, and are configured to be capable of elastic displacement in an arrow Y direction with a supporting point in the vicinity of a boundary between the actuating pieces 28 and the slide portion 27. The projection 34 formed at an end of the actuating piece 28 is approximately trapezoidal, and is provided on the face opposed to the bottom face of the case 11 so as to engage the projection 34 with the convex portions 35 formed on the bottom face of the case 11. Consequently, the actuating pieces 28 press the plate spring portion 18 shown in FIGS. 6A and 6B so as to elastically displace the plate spring portion 18. In a state in which the projection 34 of the actuating piece 28 is not engaged with the convex portions 35, the actuating pieces 28 does not project from inside the concave portion 16 so that the actuating piece 28 does not slidably contact the plate spring portion 18. On an end side of the actuating piece 28, the retaining face 37 is formed to be approximately orthogonal to the side face of the actuating pieces 28. When the slide member 21 is moved in the arrow b direction shown in FIG. 6A, the retaining face 37 hits the stopper face 38 shown in FIG. 8A to engage the slide member 21 with the case 11 so that the move of the slide member 21 is regulated.

It is also possible, for instance, to provide a projection abutted by the plate spring portion 18 on the face of each actuating piece 28 opposed to the plate spring portion 18 and also fine-tune a displacement amount of the plate spring portion 18 according to a projected amount of the projection.

Figure 10:
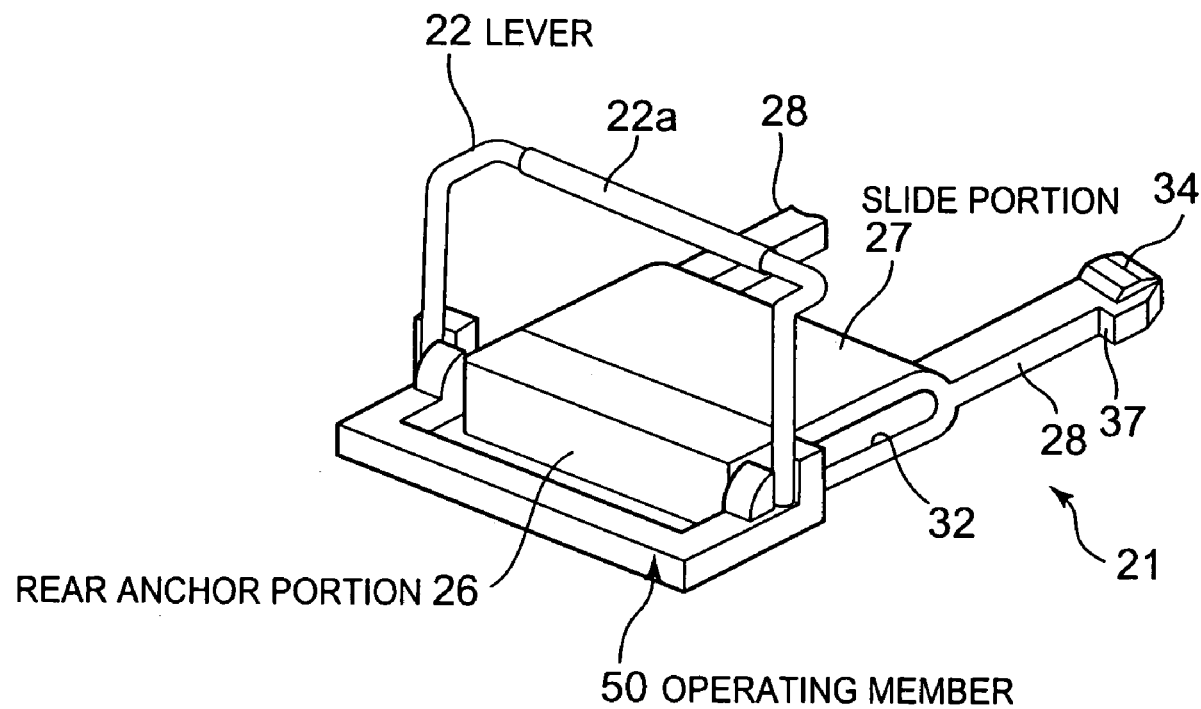
FIG. 10 is a perspective view showing a state in which a lever 22 and an operating member 50 are combined with a slide member 21.
Figure 11A:
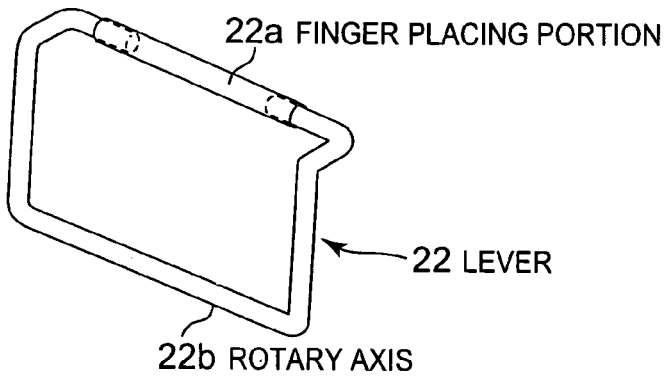
FIGS. 11A to 11C are exploded perspective views of the lever 22, slide member 21 and operating member 50 respectively.
Figure 11B:
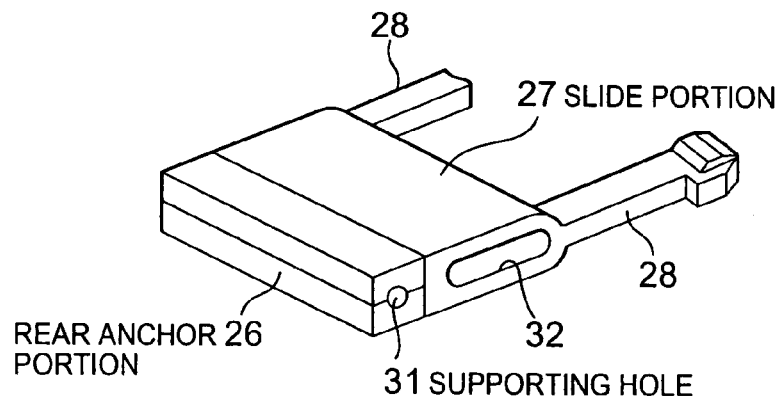
Figure 11C:
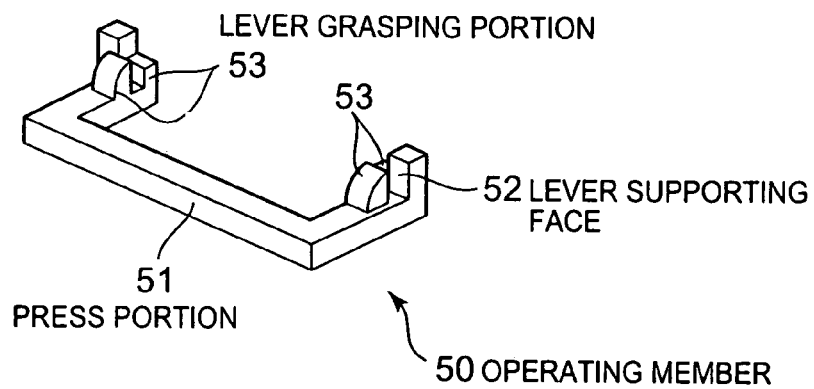

FIG. 10 is a perspective view showing a state in which the lever 22 and the operating member 50 are combined with the slide member 21. FIGS. 11A to 11C are exploded perspective views of the lever 22, slide member 21 and operating member 50 respectively. In FIGS. 10 and 11B, a part of one actuating piece 28 is shown in a broken state.

In FIG. 11A, the lever 22 has the finger placing portion 22a provided in the upper portion and a rotary axis 22b axially supported by the supporting hole 31 of the rear anchor portion 26 described later. The user-operates the lever 22 by placing his or her finger on the finger placing portion 22a. The lever 22 may be formed with the metal such as stainless or the resin such as PPS, and the finger placing portion 22a may be color-coded for each specification of the optical transceiver 1 by a transmission distance as required.

In FIG. 11B, the rear anchor portion 26 is divided in two along a central axis of the supporting hole 31. The members divided in two are mutually joined as if sandwiching the rotary axis 22b of the lever 22 in the supporting hole 31 so that the rear anchor portion 26 can rotatably support the rotary axis 22b.

In FIG. 11C, a press portion 51 is pushed down by the user in order to turn the lever 22 to the front of the case 11. A lever bearing 52 provides torque generated when the user pushes down the press portion 51 to the lever 22. A lever grasping portion 53 grasps the rotary axis 22b of the lever 22. The operating member 50 is mounted on the lever 22 by setting the lever grasping portion 53 in the rotary axis 22b of the lever 22 supported by the rear anchor portion 26 from the bottom of FIG. 11A. When the operating member 50 is mounted on the lever 22, the press portion 51 of the operating member 50 is positioned anterior to the front end face of the case 11 and lower than an area anterior to the end connection 11a formed on the case 11 as shown in FIGS. 6A and 6B.

The operating member 50 is formed by bending a metal plate formed in a predetermined form. For instance, it may be formed by bending wiry metal into the predetermined form.

Subsequently, a description will be given by referring to FIGS. 12 to 17B as to operation for releasing the lock between the case 11 and the cage 2.

Figure 12:
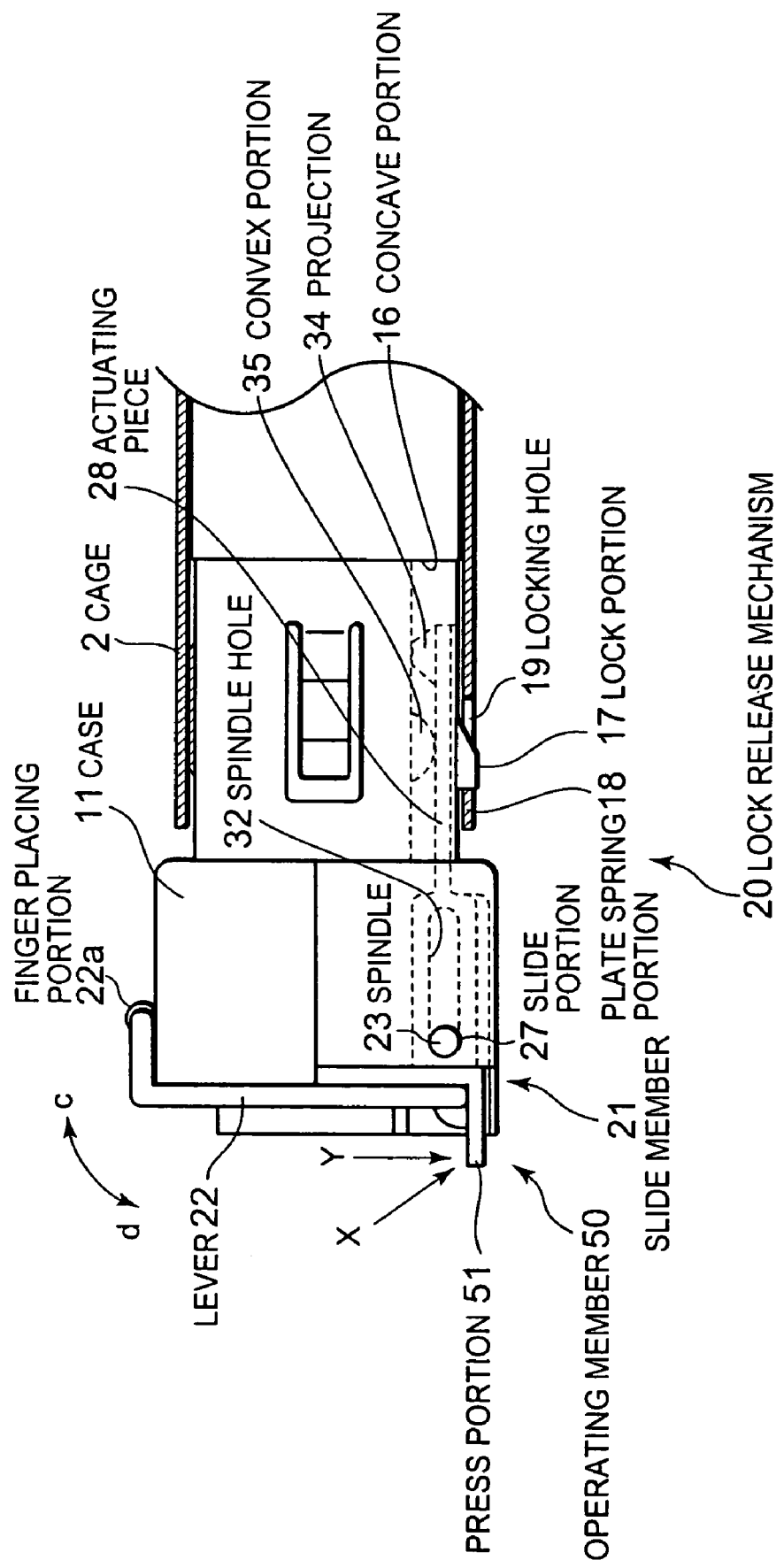
FIG. 12 is a side view of the optical transceiver 1 showing a state in which the case 11 and cage 2 of the optical transceiver 1 are locked.

FIG. 12 is a side view of the optical transceiver 1 showing a state in which the case 11 and cage 2 of the optical transceiver 1 are locked. In FIG. 12, when the case 11 of the optical transceiver 1 is inserted in the cage 2, the lock portion 17 and locking hole 19 are locked, and the lever 22 is placed at a position abutting the front side of the case 11. In this case, the press portion 51 of the operating member 50 is placed at a position projecting on the front side of the case 11. The projection 34 of each actuating piece 28 of the slide member 21 is separated from the convex portion 35. Each actuating piece 28 keeps a position approximately parallel with the bottom face of the concave portion 16 so as to secure a gap between itself and the plate spring portion 18.

To release the lock between the case 11 and the cage 2, the user needs to turn the lever 22 in the arrow d direction to bring it down on the front side of the case 11. For that reason, the user turns the lever 22 in the arrow d direction by placing his or her finger on the finger placing portion 22a of the lever 22 positioned in the upper portion of the optical transceiver 1. In this case, it is also possible for the user to turn the lever 22 in the arrow d direction by pushing the press portion 51 in an arrow X direction. The direction of pushing is not limited to the X direction but may be another direction, such as a Y direction for instance.

Figure 13:
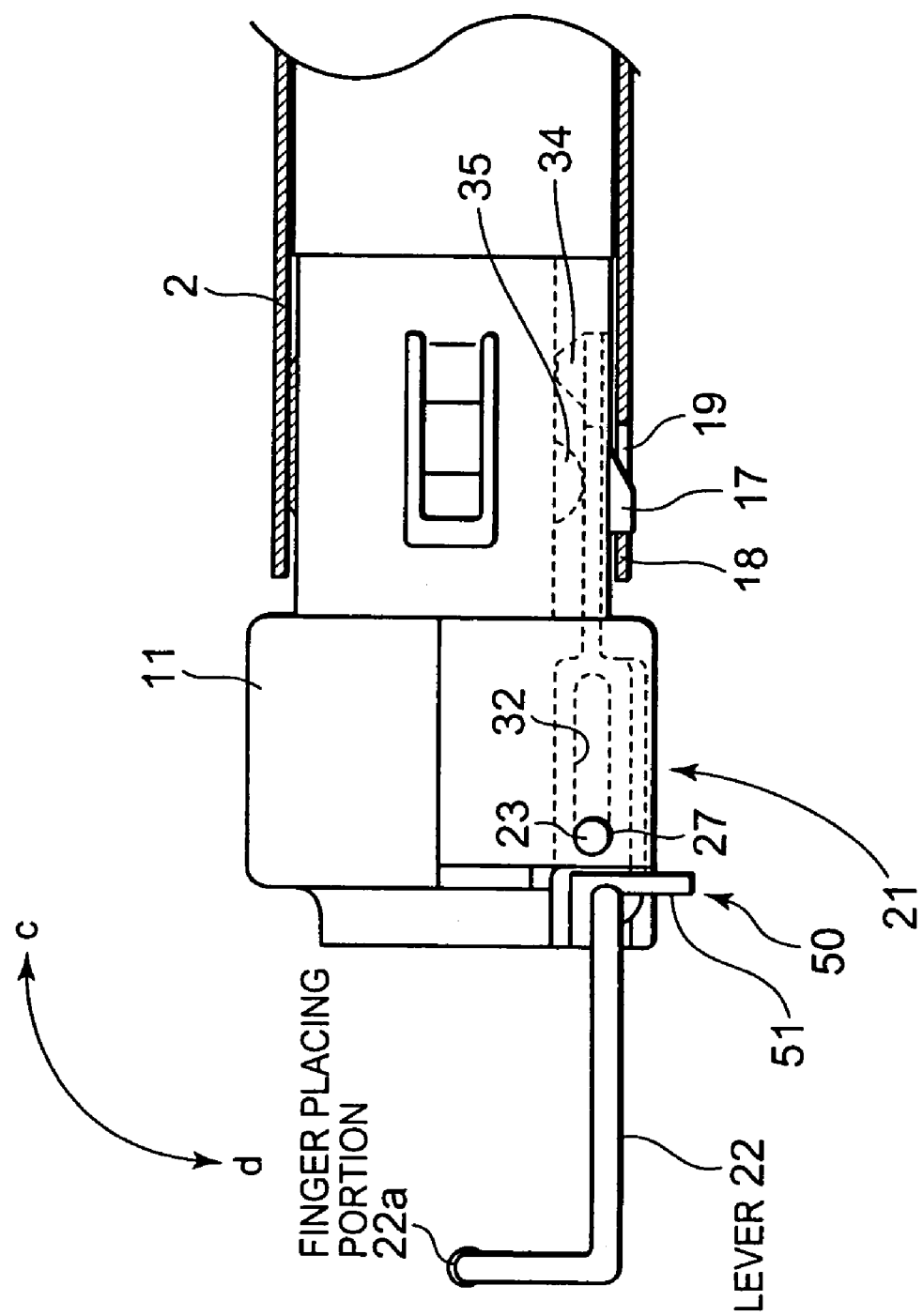
FIG. 13 is a side view of the optical transceiver 1 showing a state in which the lever 22 is turned in a direction of an arrow d of FIG. 12 and projecting to a front side of the case 11.

FIG. 13 is a side view of the optical transceiver 1 showing a state in which the lever 22 is turned in the direction of the arrow d of FIG. 12 and projecting to a front side of the case 11. In FIG. 13, if the lever 22 is turned in the arrow d direction, the user can easily pull out the case 11 by using the lever 22.

Figure 14:
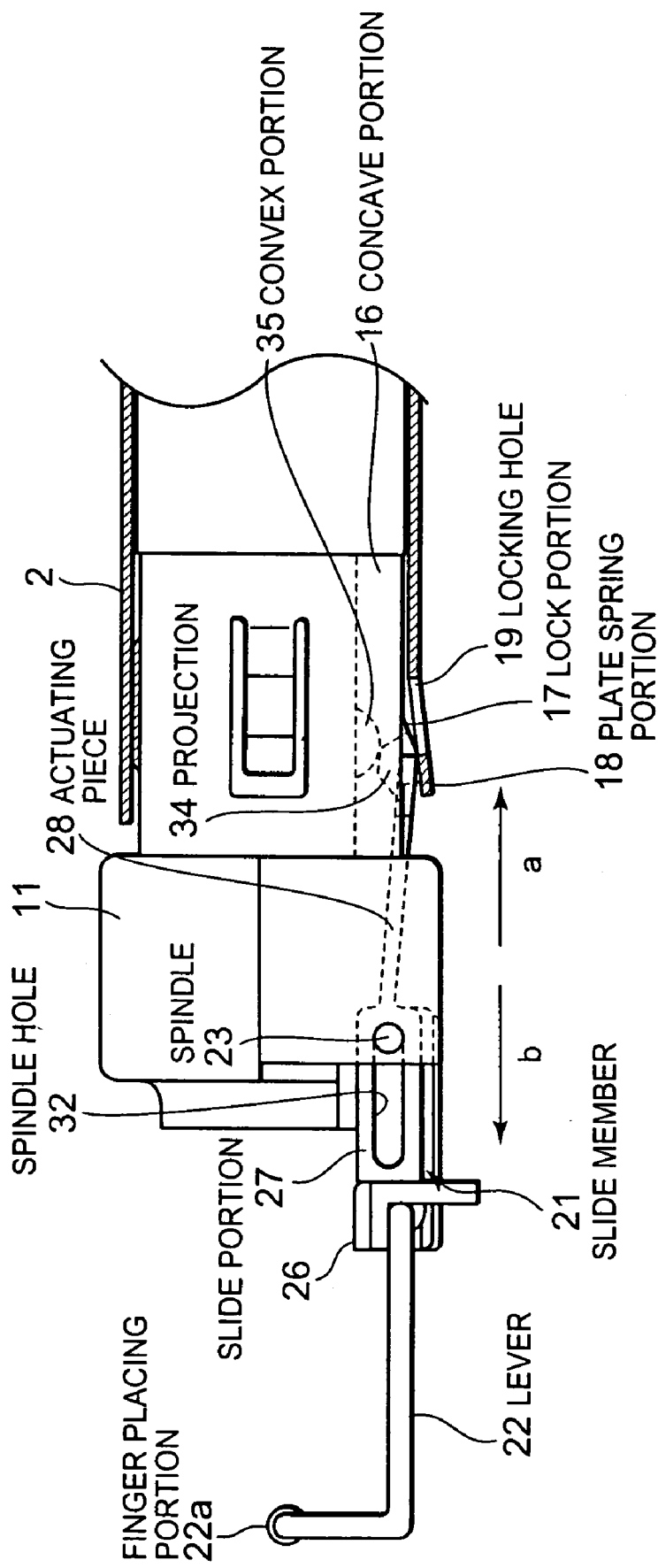
FIG. 14 is a side view of the optical transceiver 1 showing a state in which the lever 22 is pulled in the direction of an arrow b.

FIG. 14 is a side view of the optical transceiver 1 showing a state in which the lever 22 is pulled in the direction of the arrow b. In FIG. 14, if the user places his or her finger on the finger placing portion 22a and pulls the lever 22 in the arrow b direction, the slide member 21 moves likewise in the arrow b direction. In this case, the slide member 21 moves in the arrow b direction along the spindle 23 inserted into the spindle hole 32 of the slide portion 27. When a back end face of the spindle hole 32 is placed at a position to hit the spindle 23, the projection 34 of the actuating piece 28 abuts the convex portion 35. In this case, the actuating piece 28 is elastically displaced with its rear anchor as the supporting point so as to sag and project an end portion thereof from inside the concave portion 16 to below the case 11. Thus, the end portion of the actuating piece 28 presses the plate spring portion 18, and elastically displaces the plate spring portion 18 in the direction for releasing the lock between the lock portion 17 and the locking hole 19.

The slide member 21 has a configuration wherein, when the slide portion 27 moves to the position to have the spindle 23 hit by the other end face of the spindle hole 32, the projection 34 of the actuating piece 28 stops near a top over the top of the convex portion 35 so as to keep an abutting state of the projection 34 and the convex portion 35. For that reason, when the slide portion 27 is placed at the position to have the spindle 23 hit by the other end face of the spindle hole 32, the plate spring portion 18 is kept in the state of having the lock between the lock portion 17 and the locking hole 19 released by the actuating piece 28. Therefore, it is possible to pull the case 11 out of the cage 2 in this state.

In the state of having the projection 34 of the actuating piece 28 abutting the proximity of the top of the convex portion 35, the end of the actuating piece 28 projecting from inside the concave portion 16 is projecting from the bottom face of the concave portion 16 by the projected amount almost equal to that of the lock portion 17. For that reason, it is possible to release the lock between the lock portion 17 and the locking hole 19 just by elastically displacing the plate spring portion 18 smoothly and to the minimum necessary.

Figure 15:
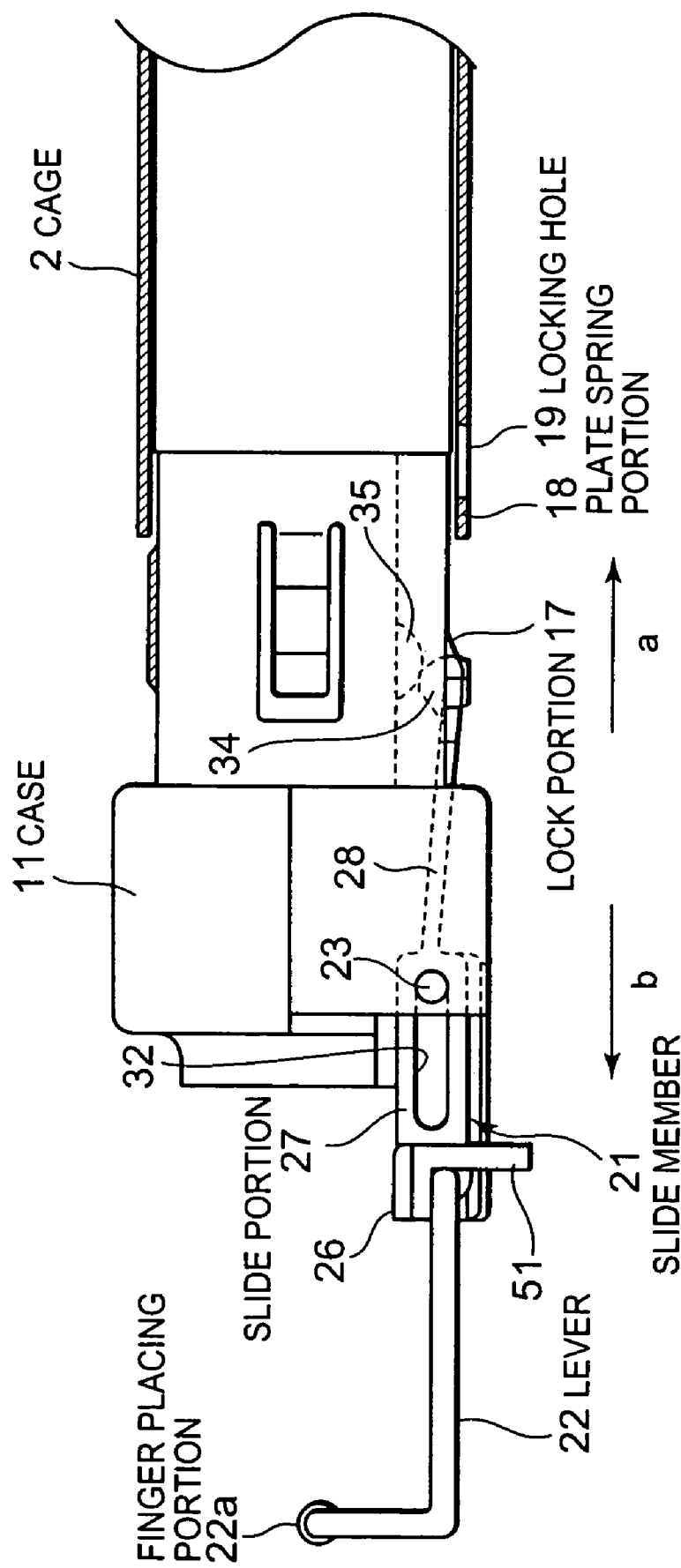
FIG. 15 is a side view of the optical transceiver 1 showing a state in which the lever 22 is further pulled in the direction of the arrow b and the case 11 is pulled out of the cage 2.

FIG. 15 is a side view of the optical transceiver 1 showing a state in which the lever 22 is further pulled in the direction of the arrow b and the case 11 is pulled out of the cage 2.

In FIG. 15, if the lever 22 is further pulled from the state of FIG. 14, the slide member 21 further moves in the arrow b direction so as to pull the case 11 out of the cage 2. If the case 11 is pulled out of the cage 2, the lock portion 17 is separated from the locking hole 19, and the plate spring portion 18 returns to an even state by its own resilient restoration force.

When the slide member 21 moves in the arrow b direction in FIGS. 14 and 15, the spindle 23 abuts the back end of the spindle hole 32 and the retaining face 37 formed on the actuating piece 28 hits the stopper face 38 of the case 11. Thus, the slide member 21 is securely prevented from dropping out of the case 11. As the slide portion 27 slides along the opposed side faces of the guide groove 33 of the case 11, positioning is performed as to the relative position of the projection 34 in a width direction of the case 11 against the convex portion 35. Furthermore, the slide portion 27 can move in a range in which the spindle hole 32 is movable along the spindle 23 so that a moving range of the slide member 21 in the arrow a or b directions is securely regulated and also the positioning is securely performed as to relative positions in the moving direction of the projection 34 of the actuating piece 28 and convex portion 35.

Therefore, as the slide member 21 moves in the arrow a or b directions, it is possible to smoothly switch between an abutting state and an abutting-released state of the projection 34 of the actuating piece 28 and convex portion 35 so as to secure sufficient reliability for operation for releasing the lock between the lock portion 17 and the locking hole 19 by the actuating piece 28.

Subsequently, a description will be given as to the operation for pulling the optical transceiver 1 of the present invention out of the cage 2 on the communication apparatus having multiple optical transceivers 1 mounted at a high density thereon.

Figure 16A:
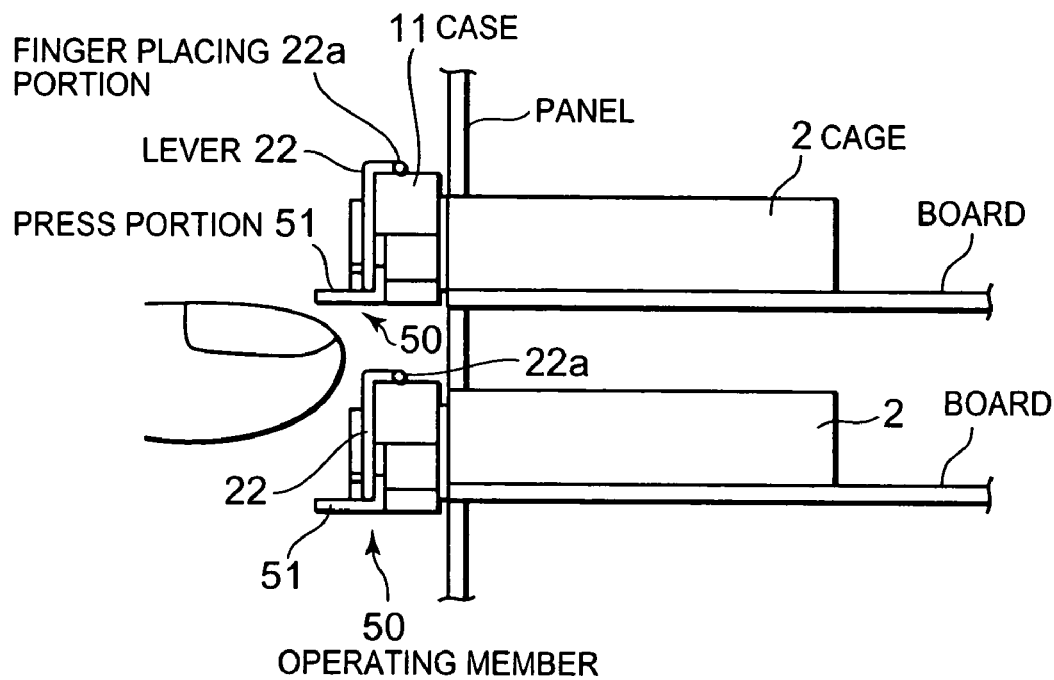
FIGS. 16A to 17B are diagrams for describing operation for pulling the optical transceiver 1 of the present invention out of the cage 2 on the communication apparatus having multiple optical transceivers 1 mounted at a high density thereon.

FIGS. 16A to 17B are diagrams for describing the operation for pulling the optical transceiver 1 of the present invention out of the cage 2 on the communication apparatus having multiple optical transceivers 1 mounted at a high density thereon. In FIG. 16A, the user cannot place his or her finger on the finger placing portion 22a in the upper portion of the lever 22 because the optical transceivers 1 are placed at a high density vertically.

Figure 16B:
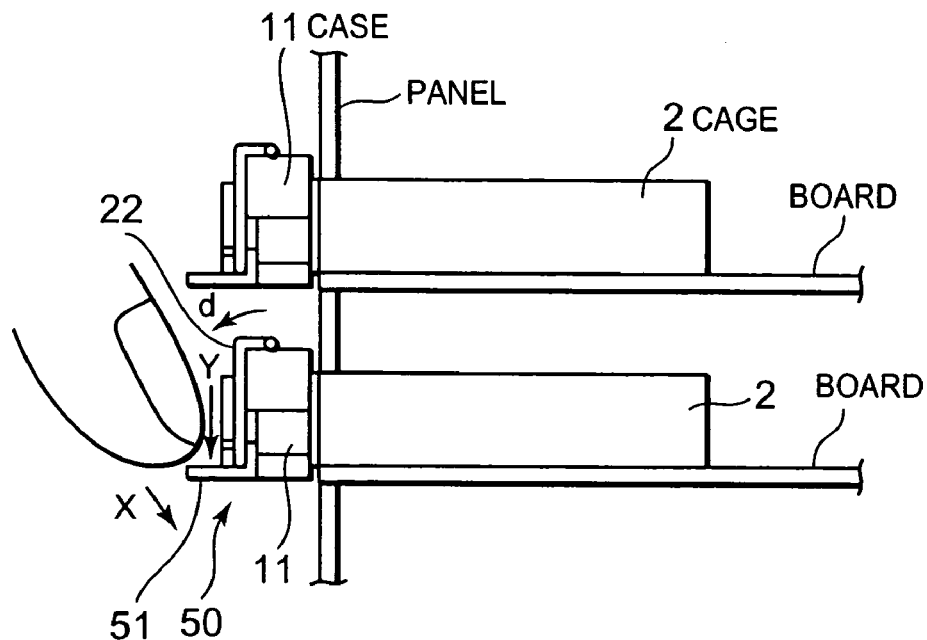

As shown in FIG. 16B, the user can turn the lever 22 in the arrow d direction by pushing the press portion 51 in an arrow X direction. To be more specific, on pushing the press portion 51 in the arrow X direction, the torque generated on the rotary axis 22b of the lever 22 is given to the lever 22 by the lever bearing 52 supporting a backside of the lever 22 so that the lever 22 turns in the arrow d direction shown in FIGS. 12 and 13. The direction of pushing is not limited to the X direction but may be another direction, such as the Y direction for instance.

Figure 17A:
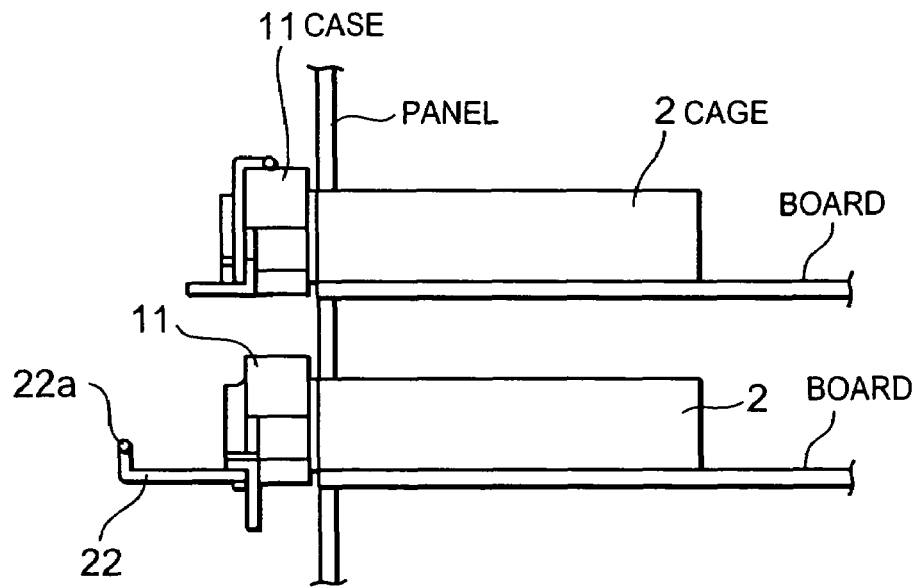
Figure 17B:
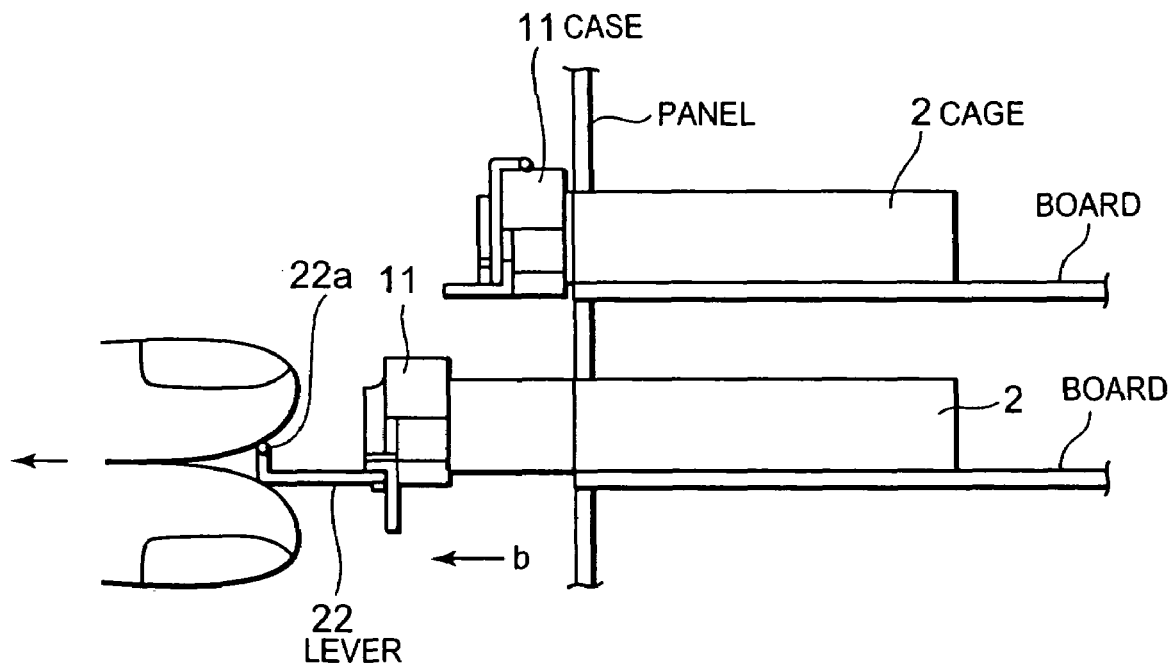

FIG. 17A shows a state in which the lever 22 turns and projecting to the front side of the case 11. Therefore, as shown in FIG. 17B, the user can pull the optical transceiver 1 out of the cage 2 by pulling the lever 22 projecting to the front side of the case 11 in the arrow b direction.

Thus, according to the optical transceiver 1 of the present invention, the user can turn the lever 22 and pull out the turned lever 22 and thereby easily and securely release the lock between the case 11 and the cage 2. Therefore, the user can easily pull the case 11 out of the cage 2 so that the operability for the user can be improved.

It is also possible, by having the lever 22 pulled by the user, to easily and continuously perform the operation for releasing the lock between the cage 2 and the case 11 and the operation for pulling the case 11 out of the cage 2.

Furthermore, even if the optical transceivers 1 are mounted at such a high density that the user cannot turn the lever 22, it is possible, according to the optical transceiver 1 of the present invention, for the user to turn the lever 22 easily by pressing the press portion 51 of the operating member 50. For that reason, it is possible to improve the operability for the user while miniaturizing and rendering high-density the communication apparatuses having the multiple optical transceivers 1 mounted thereon.

In the case where the case 11 of the optical transceiver 1 is inserted in the cage 2, the plate spring portion 18 of the cage 2 is elastically displaced gradually and pushed down by the inclined plane 17a of the lock portion 17 once the case 11 is inserted in the cage 2 in the arrow a direction shown in FIG. 6A. If the case 11 is further inserted in the cage 2, the lock portion 17 is locked in the locking hole 19 and the case 11 is completely locked in the cage 2.

Next, the second embodiment of the present invention will be described.

Figure 18:
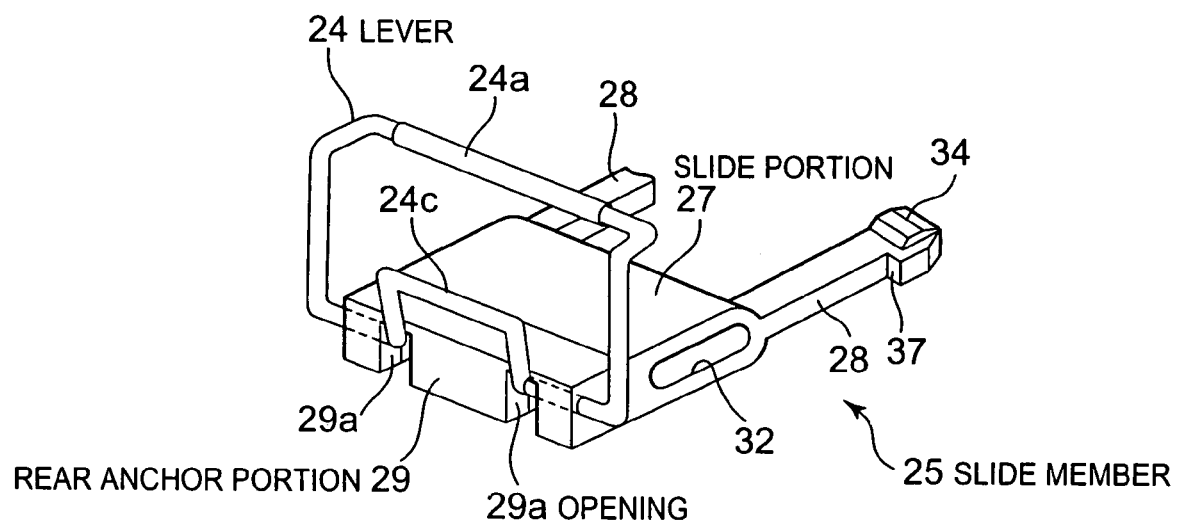
FIG. 18 is a perspective view showing a state in which a slide member 25 and a lever 24 are combined according to a second embodiment of the present invention.
Figure 19A:
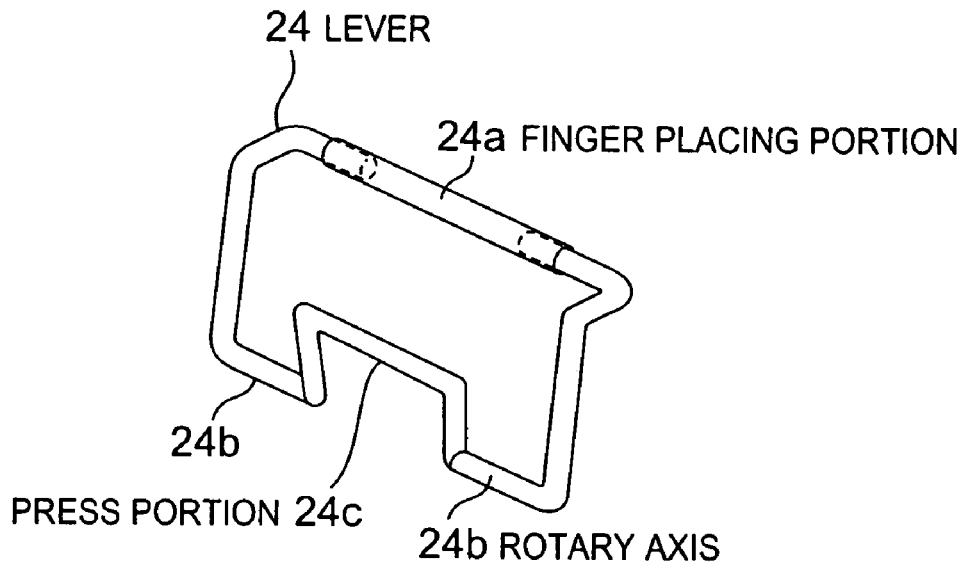
FIGS. 19A and 19B are exploded perspective views of the lever 24 and slide member 25 respectively.
Figure 19B:
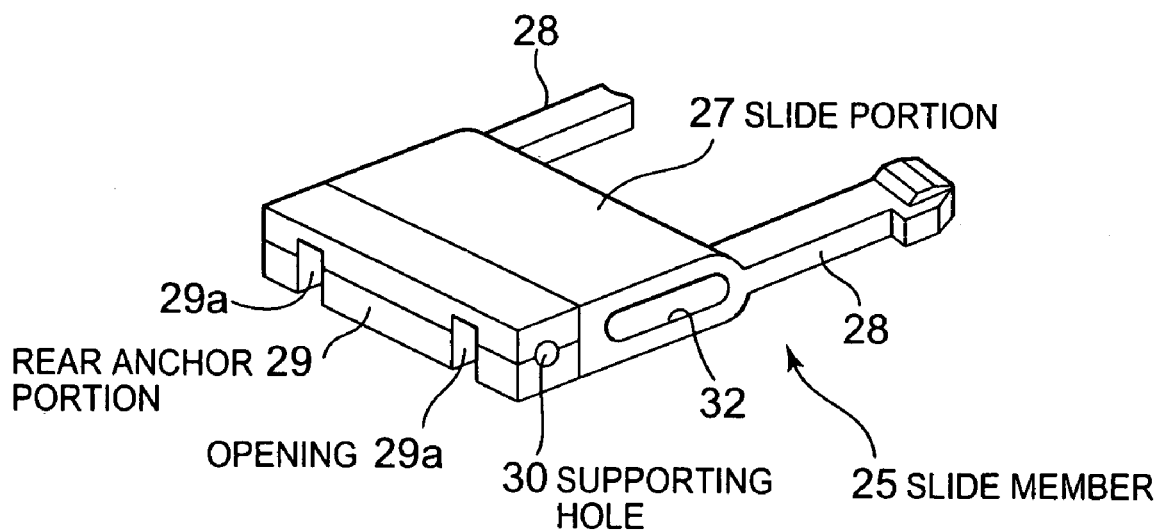

FIG. 18 is a perspective view showing a state in which a slide member 25 and a lever 24 are combined according to a second embodiment of the present invention. FIGS. 19A and 19B are exploded perspective views of the lever 24 and slide member 25 respectively. As with FIGS. 11 and 12, a part of one actuating piece 28 is shown in a broken state. The optical transceiver 3 of this embodiment does not comprise the operating member 50 of the first embodiment, and has a press portion 24c formed as a part of the lever 24.

As for the second embodiment, the same components as those of the first embodiment are given the same reference characters. In particular, the slide portion 27 and actuating piece 28 of this embodiment have the same configurations as those in the first embodiment, and so a description thereof will be omitted in order to avoid redundancy.

In FIGS. 18 and 19A, the lever 24 comprises the press portion 24c in addition to a finger placing portion 24a provided in the upper portion and a rotary axis 24b axially supported by a supporting hole 30 of a rear anchor portion 29. The press portion 24c is pushed down by the user in order to turn the lever 24 to the front of the case 11. In the state of having the lever 24 locked to the case 11, the press portion 24c is positioned anterior to the front end face of the case 11 and lower than the area anterior to the end connection 11a of the case 11. The lever 24 may be formed with the metal such as stainless or the resin such as PPS, and the finger placing portion 24a may be color-coded for each specification of the optical transceiver 3 by the transmission distance, for instance, as required.

In FIGS. 18 and 19B, the rear anchor portion 29 is divided in two along a central axis of the supporting hole 30. The members of the rear anchor portion 29 divided in two are mutually joined as if sandwiching the rotary axis 24b of the lever 24 in the supporting hole 30 so that there a ranch or portion 29 can rotatably support the rotary axis 24b. Two openings 29a are formed on the front side of the rear anchor portion 29, and the press portion 24c of the lever 24 is projected to the front side of the rear anchor portion 29 through these openings 29a.

Subsequently, a description will be given by referring to FIGS. 20 to 25B as to the operation for releasing the lock between the case 11 and the cage 2 according to the present embodiment.

Figure 20:
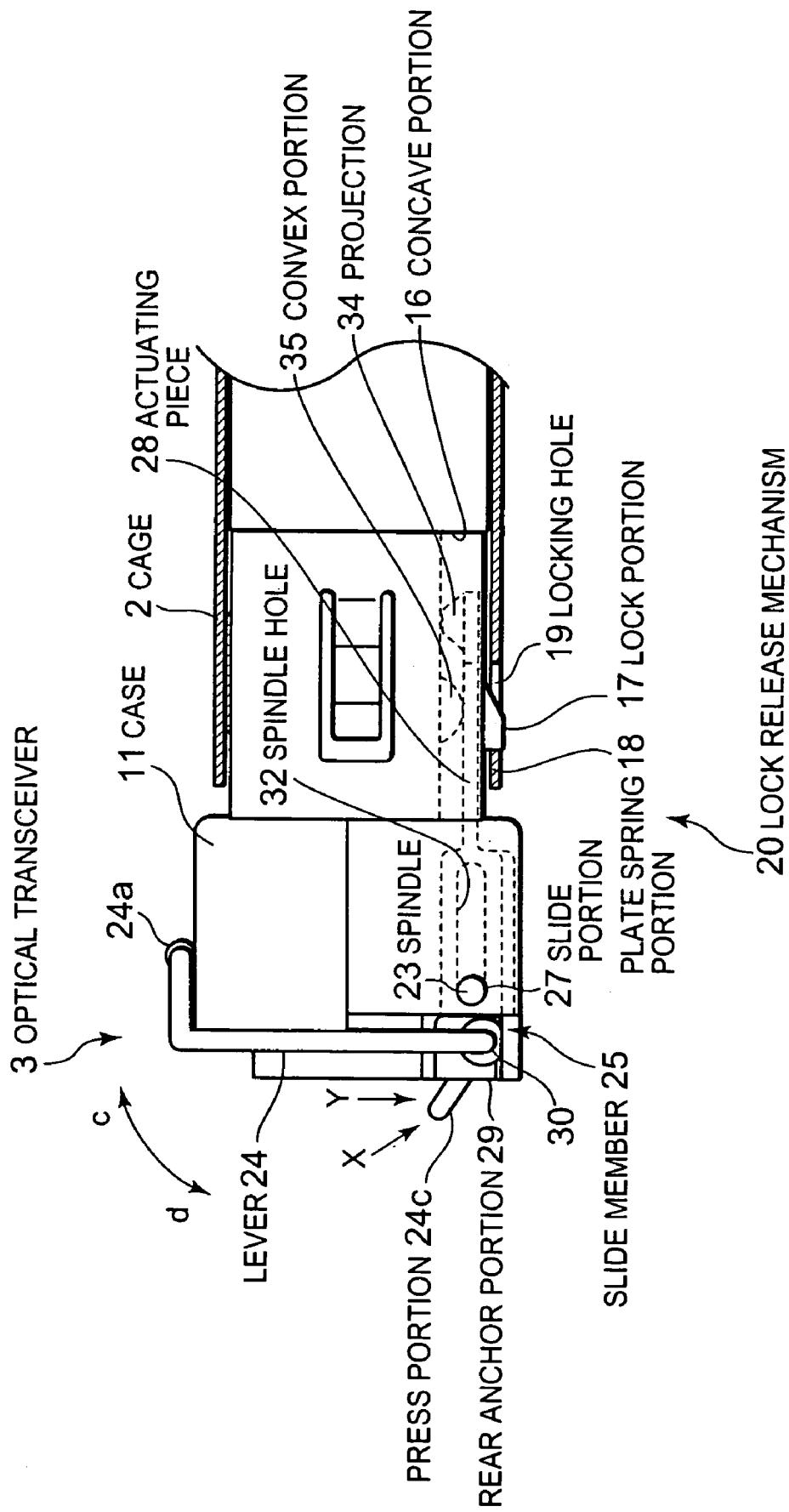
FIG. 20 is a side view of the optical transceiver 3 showing a state in which the case 11 and cage 2 of the optical transceiver 3 are locked according to the second embodiment of the present invention.

FIG. 20 is a side view of an optical transceiver 3 showing the state in which the case 11 and cage 2 of the optical transceiver 3 are locked according to the second embodiment of the present invention. In FIG. 20, when the case 11 of the optical transceiver 3 is inserted in the cage 2, the press portion 24c is placed at a position projecting to the front side of the case 11. To release the lock between the case 11 and the cage 2, the user needs to turn the lever 24 in the arrow d direction to bring it down on the front side of the case 11. For that reason, the user turns the lever 24 in the arrow d direction by placing his or her finger on the finger placing portion 24a of the lever 24 positioned in the upper portion of the optical transceiver 3. In this case, it is also possible for the user to turn the lever 24 in the arrow d direction by pushing the press portion 24c in the arrow X direction. The direction of pushing is not limited to the X direction but may be another direction, such as the Y direction for instance.

Figure 21:
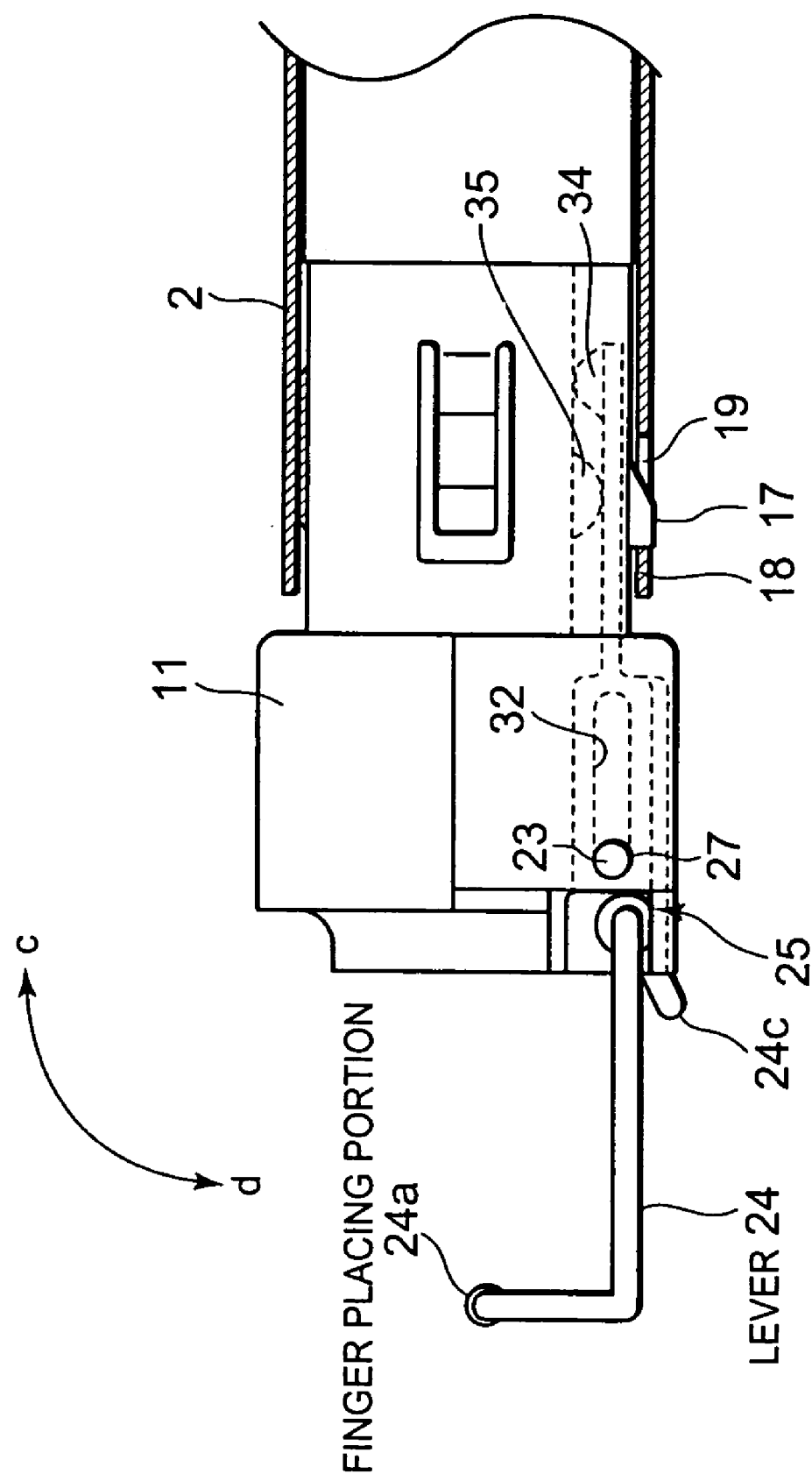
FIG. 21 is a side view of the optical transceiver 3 showing a state in which the lever 24 is turned in the direction of the arrow d of FIG. 20 and projected to a front side of the case 11.

FIG. 21 is a side view of the optical transceiver 3 showing a state in which the lever 24 is turned in the direction of the arrow d of FIG. 20 and projecting to the front side of the case 11.

In FIG. 21, if the lever 24 is turned in the arrow d direction, the user can easily pull out the case 11 by using the lever 24.

Figure 22:
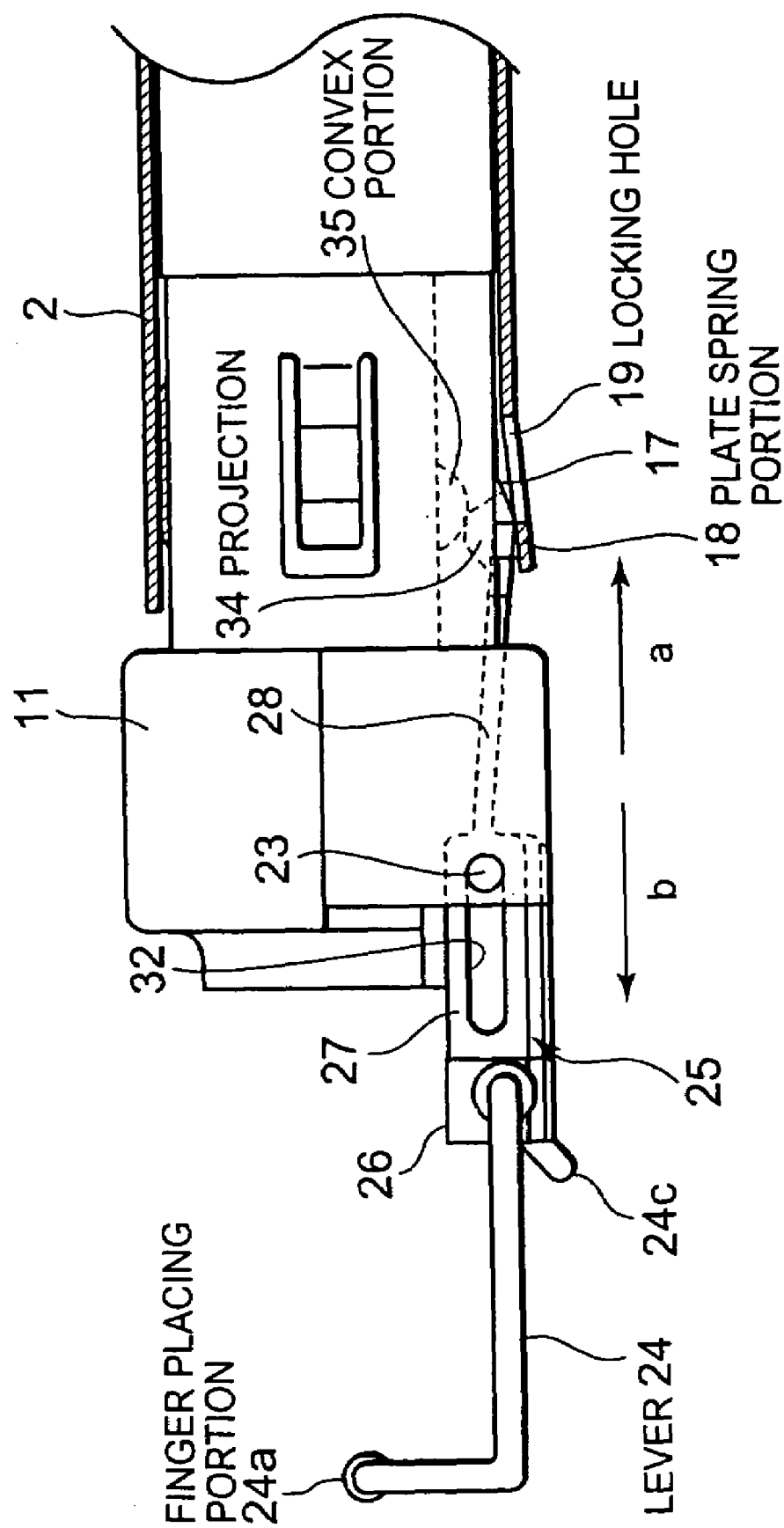
FIG. 22 is a side view of the optical transceiver 3 showing a state in which the lever 24 is pulled in the direction of the arrow b.
Figure 23:
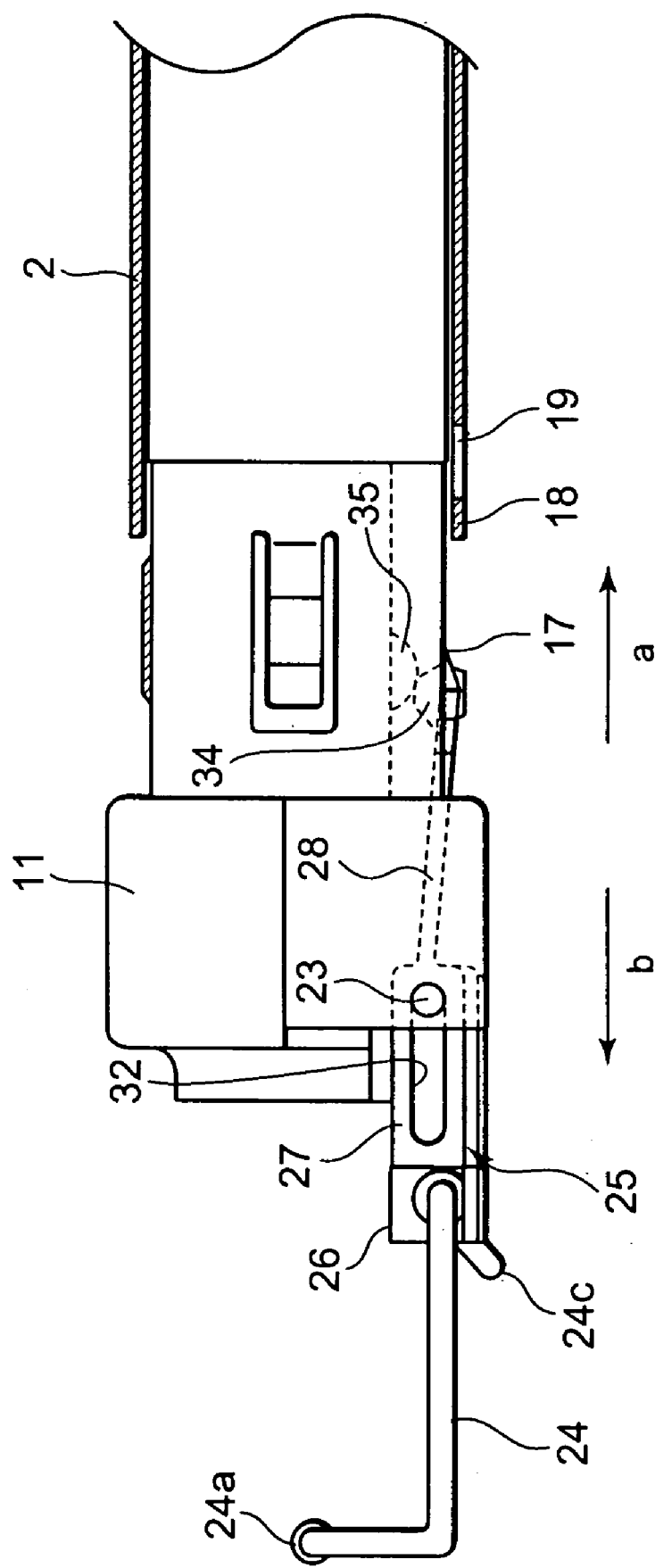
FIG. 23 is a side view of the optical transceiver 3 showing a state in which the lever 24 is further pulled in the direction of the arrow b and the case 11 is pulled out of the cage 2.

FIG. 22 is a side view of the optical transceiver 3 showing a state in which the lever 24 is pulled in the direction of the arrow b. FIG. 23 is a side view of the optical transceiver 3 showing a state in which the lever 24 is further pulled in the direction of the arrow b and the case 11 is pulled out of the cage 2. The description of FIGS. 22 and 23 is the same as that of FIGS. 14 and 15, which will be omitted in order to avoid redundancy. In FIGS. 22 and 23, however, the press portion 24c is positioned in a lower front part of the optical transceiver 3 rather than in a vertical direction to the case 11 of the optical transceiver 3.

Subsequently, a description will be given as to the operation for pulling the optical transceiver 3 of the present invention out of the cage 2 on the communication apparatus having multiple optical transceivers 3 mounted at a high density thereon.

FIGS. 24A to 25B are diagrams for describing the operation for pulling the optical transceiver 3 of the present invention out of the cage 2 on the communication apparatus having the multiple optical transceivers 3 mounted at a high density thereon. In FIG. 24B, the user can turn the lever 24 in the arrow d direction by pushing the press portion 24c in the arrow X direction. To be more specific, on pushing the press portion 24c in the arrow X direction, the torque generated on the rotary axis 24b of the lever 24 is given to the lever 24 so that the lever 24 turns in the arrow d direction shown in FIGS. 20 and 21. The direction of pushing is not limited to the X direction but may be another direction, such as the Y direction for instance.

Figure 24A:
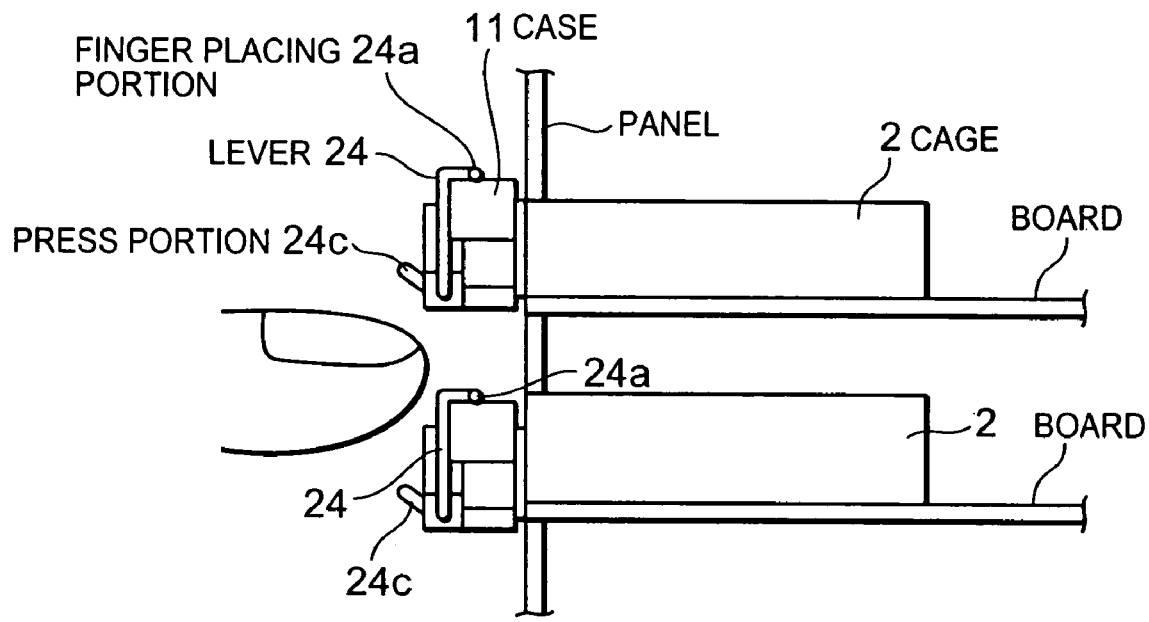
FIGS. 24A to 25B are diagrams for describing operation for pulling the optical transceiver 3 of the present invention out of the cage 2 on the communication apparatus having multiple optical transceivers 3 mounted at a high density thereon.
Figure 24B:
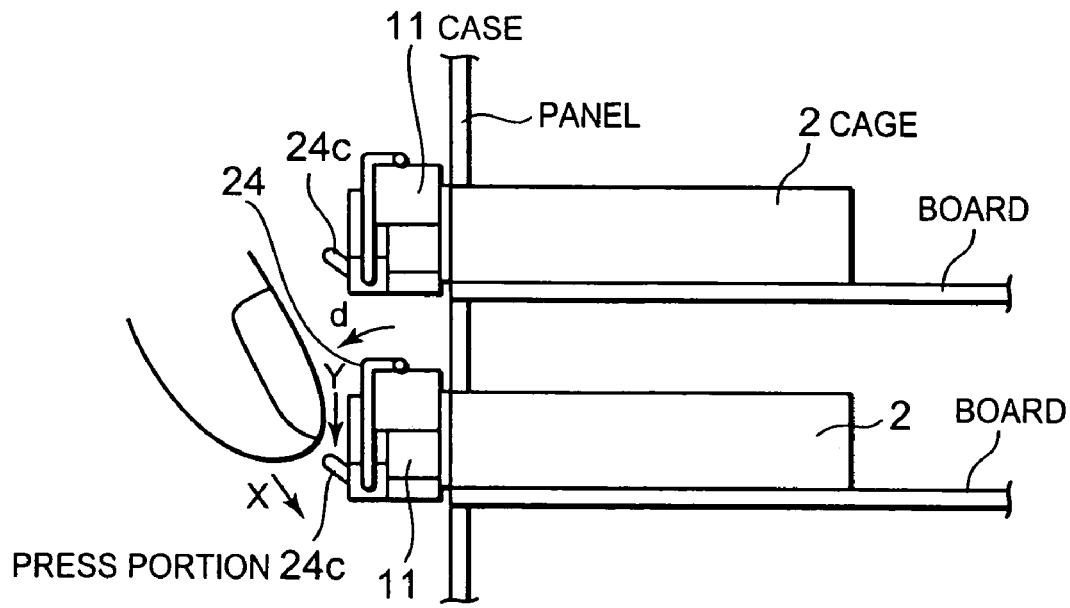
Figure 25A:
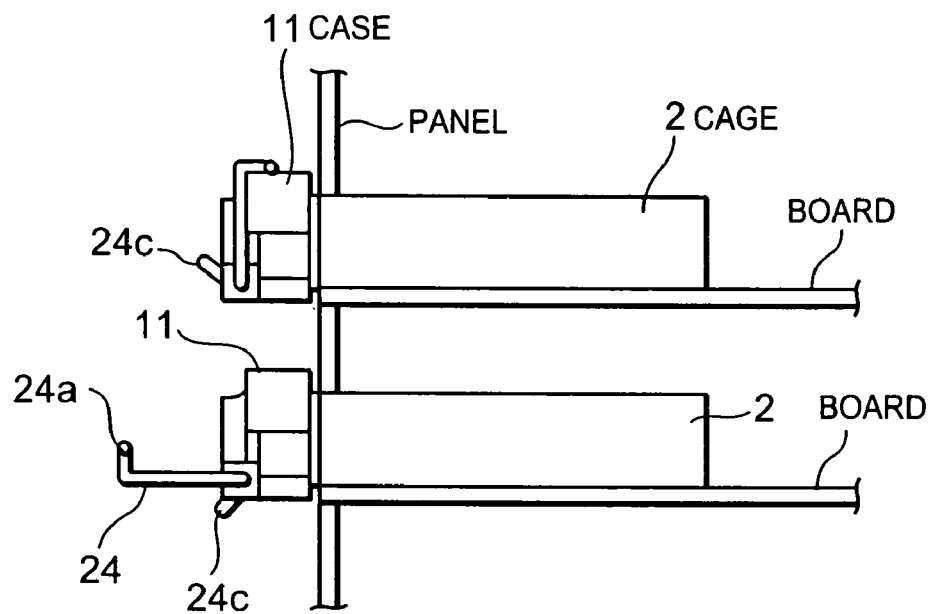
Figure 25B:
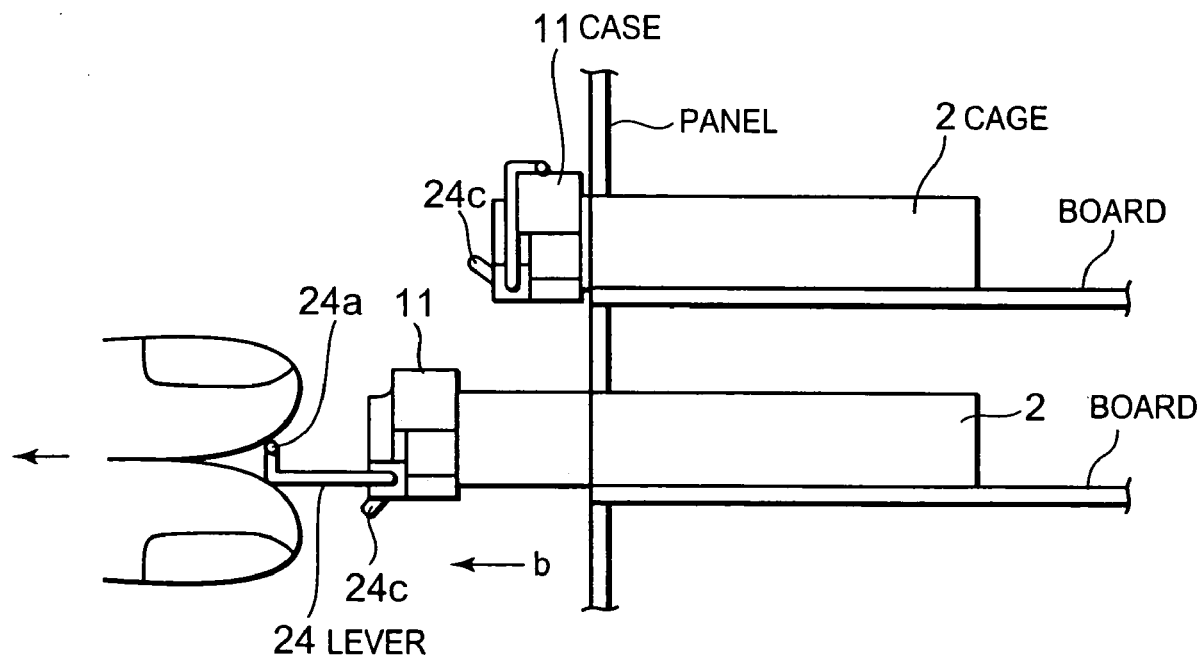

The description of FIGS. 24A, 25A and 25B is the same as that of FIGS. 16A, 17A and 17B, which will be omitted in order to avoid redundancy.

Thus, it is possible, according to the optical transceiver 3 of this embodiment, for the user to turn the lever 24 easily by pressing the press portion 24c. For that reason, it is possible to improve the operability for the user on the communication apparatuses having the multiple optical transceivers 3 mounted thereon which is miniaturized and rendered high-density. As the press portion 24c is integrally formed with the lever 24 according to this embodiment, it is not necessary to separately provide the operating member 50 shown in the first embodiment. Consequently, it is possible to reduce manufacturing costs and simplify a manufacturing process.

Next, a third embodiment of the present invention will be described.

Figure 26A:
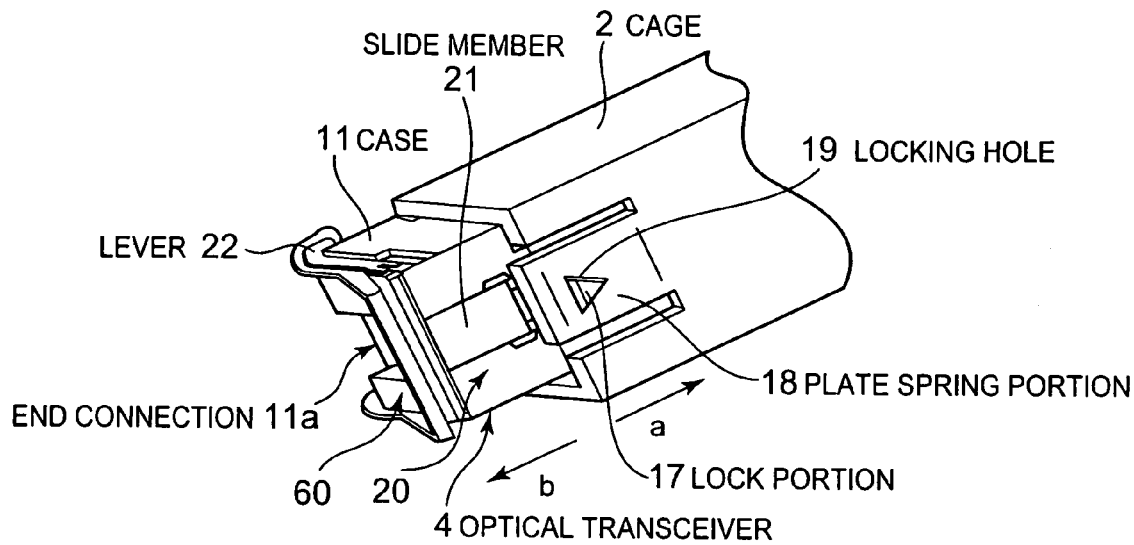
FIG. 26A is a perspective view showing a state in which an optical transceiver 4 as a third embodiment of the present invention is inserted in the cage 2.
Figure 26B:
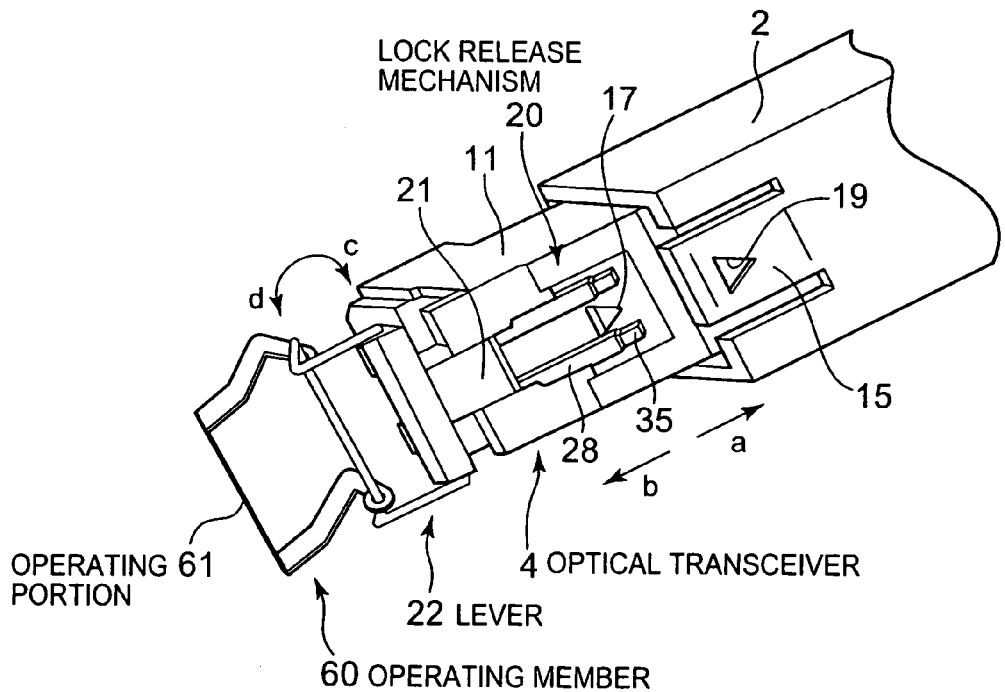
FIG. 26B is a perspective view showing a state in which the optical transceiver 4 as the third embodiment of the present invention is pulled out of the cage 2.

FIG. 26A is a perspective view showing a state in which an optical transceiver 4 as the third embodiment of the present invention is inserted in the cage 2. FIG. 26B is a perspective view showing a state in which the optical transceiver 4 of FIG. 26A is pulled out of the cage 2. The optical transceiver 4 of this embodiment has an operating member 60 different from the operating member 50 of the first embodiment in the upper portion of the lever 22. As for the third embodiment, the same components as those of the first embodiment are given the same reference characters. In particular, the configuration other than the operating member 60 of this embodiment is the same as that in the first embodiment, and so a description thereof will be omitted in order to avoid redundancy.

In FIG. 26B, the operating member 60 is mounted above the lever 22. If the user pulls the operating member 60 forward without placing his or her finger on the lever 22, the lever 22 is turned in the directions of arrows d.

Figure 27A:
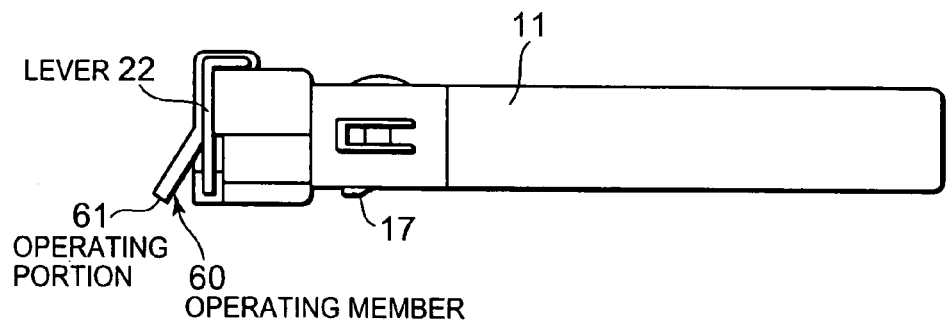
FIGS. 27A and 27B are a side view and a bottom view of the optical transceiver 4 shown in FIG. 26A.
Figure 27B:
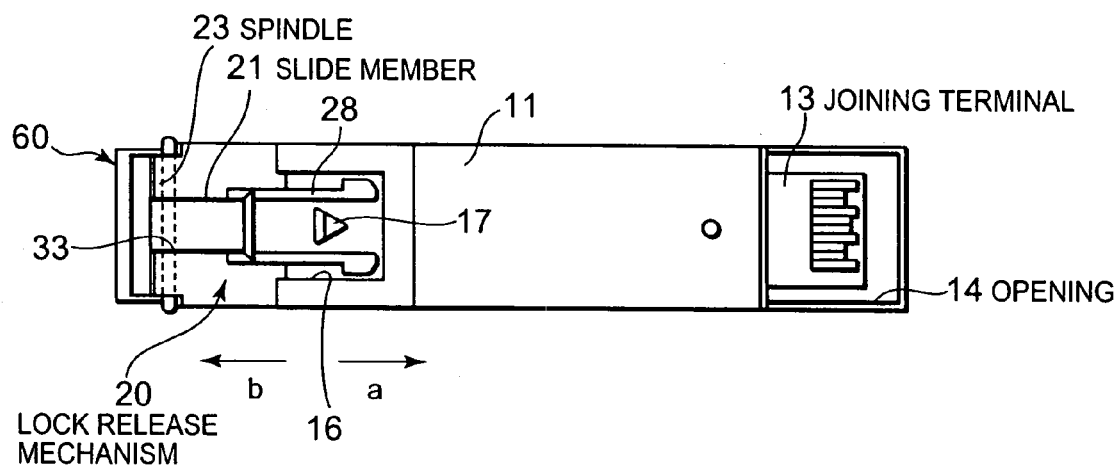

FIGS. 27A and 27B are a side view and a bottom view of the optical transceiver 4 shown in FIG. 26A respectively.

In FIG. 27A, the operating member 60 is approximately in the same form as the lever 22. However, the end thereof including an operating portion 61 to be held by the user with his or her fingers is positioned lower than the front area of the end connection 11a, that is, at the lower front of the optical transceiver 4 so that the base of the lever 22 and the operating member 60 constitute a sharp angle.

Figure 28:
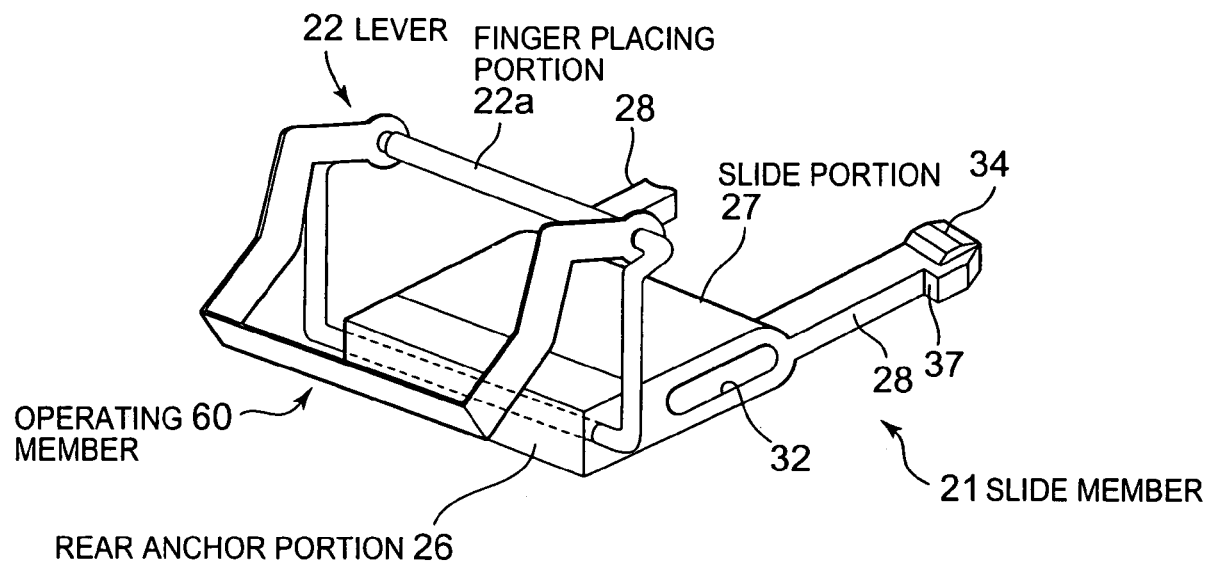
FIG. 28 is a perspective view showing a state in which the lever 22 and an operating member 60 are combined with the slide member 21.
Figure 29A:
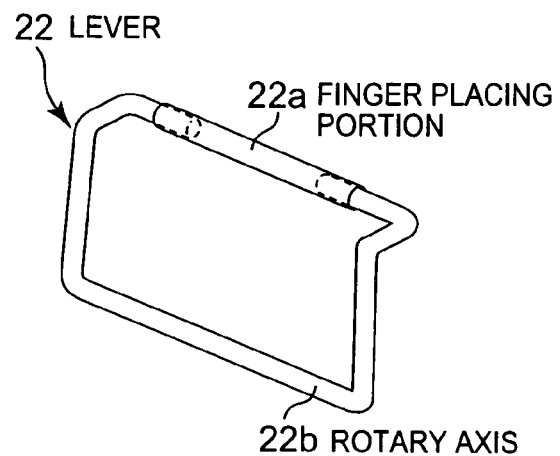
FIGS. 29A to 29C are exploded perspective views of the lever 22, slide member 21 and operating member 60 respectively.
Figure 29B:
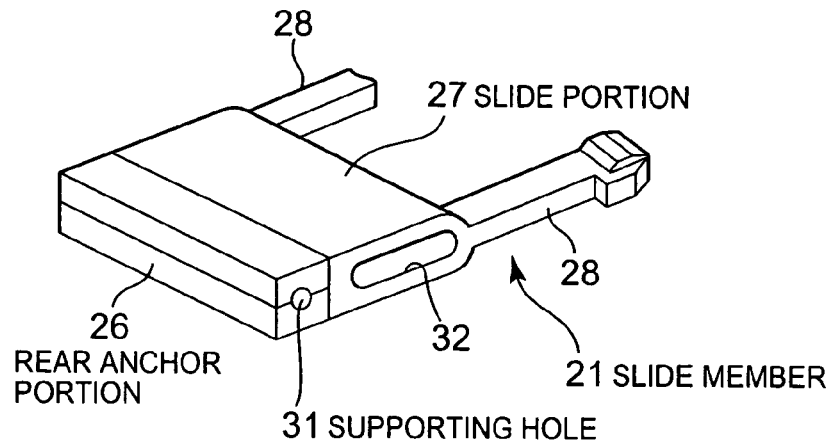
Figure 29C:
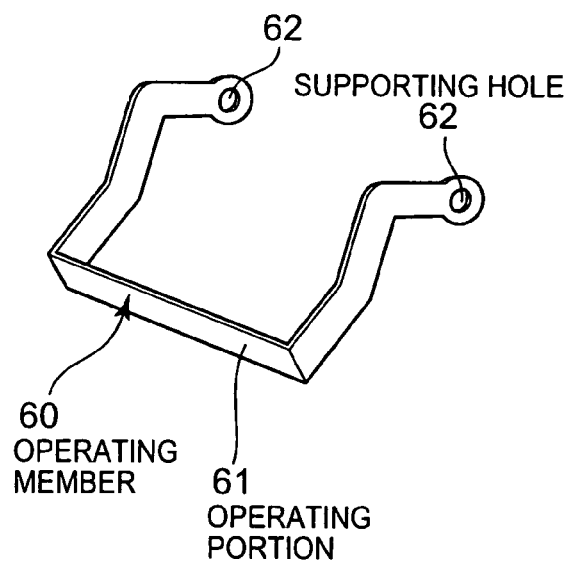

FIG. 28 is a perspective view showing a state in which the lever 22 and the operating member 60 are combined with the slide member 21. FIGS. 29A to 29C are exploded perspective views of the lever 22, slide member 21 and operating member 60 respectively. In FIGS. 28 and 29B, a part of one actuating piece 28 is shown in a broken state.

In FIGS. 28 to 29C, the operating member 60 has the operating portion 61 and a supporting hole 62. The operating portion 61 is pulled out by the user in order to turn the lever 22 to the front. The supporting hole 62 supports the operating member 60 rotatably in the proximity of both ends of the finger placing portion 22a of the lever 22. The operating member 60 is mounted on the lever 22 as follows. The supporting hole 62 of the operating member 60 is bored on both ends of the upper portion of the lever 22 before the finger placing portion 22a is mounted on the lever 22. Subsequently, the finger placing portion 22a is inserted in both ends of the upper portion of the lever 22, and the operating member 60 is thereby mounted on the lever 22.

The operating member 60 is formed by bending a metal plate formed in a predetermined form. For instance, it may be formed by bending wiry metal into the predetermined form.

Subsequently, a description will be given by referring to FIGS. 30 to 35B as to the operation for releasing the lock between the case 11 and cage 2.

Figure 30:
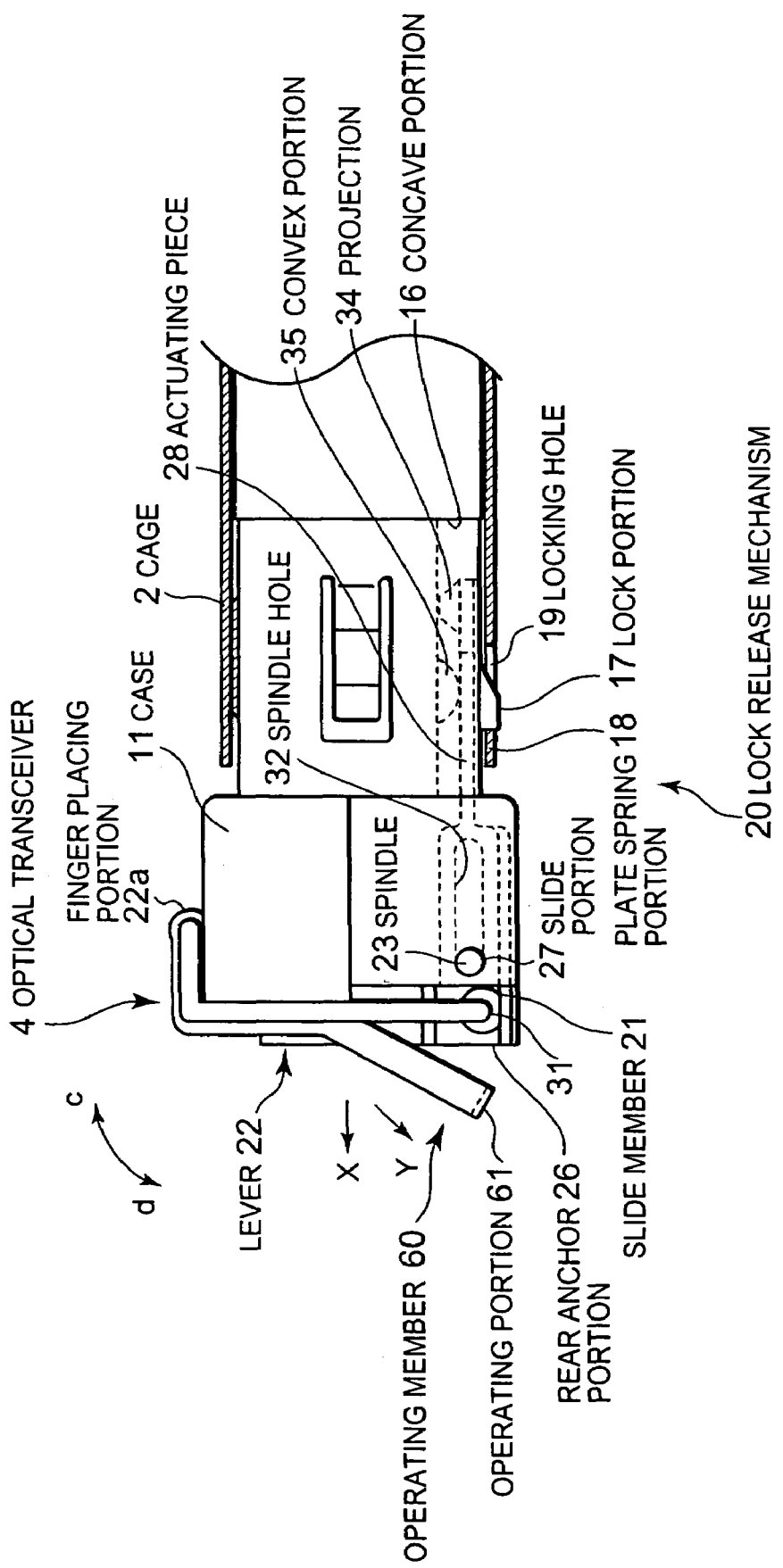
FIG. 30 is a side view of the optical transceiver 4 showing a state in which the case 11 and cage 2 of the optical transceiver 4 of the third embodiment are locked.

FIG. 30 is a side view of the optical transceiver 4 showing a state in which the case 11 and cage 2 of the optical transceiver 4 of the third embodiment are locked.

In FIG. 30, when the case 11 of the optical transceiver 4 is inserted in the cage 2, the operating portion 61 is placed at a position projecting to the front side of the case 11. To release the lock between the case 11 and the cage 2, the user turns the lever 22 in the arrow d direction by placing his or her finger on the finger placing portion 22a of the lever 22 positioned in the upper portion of the optical transceiver 4. In this case, it is also possible for the user to turn the lever 22 in the arrow d direction by pulling the operating portion 61 in the arrow X direction. The direction of pulling is not limited to the X direction but may be another direction, such as a Y direction for instance.

Figure 31:
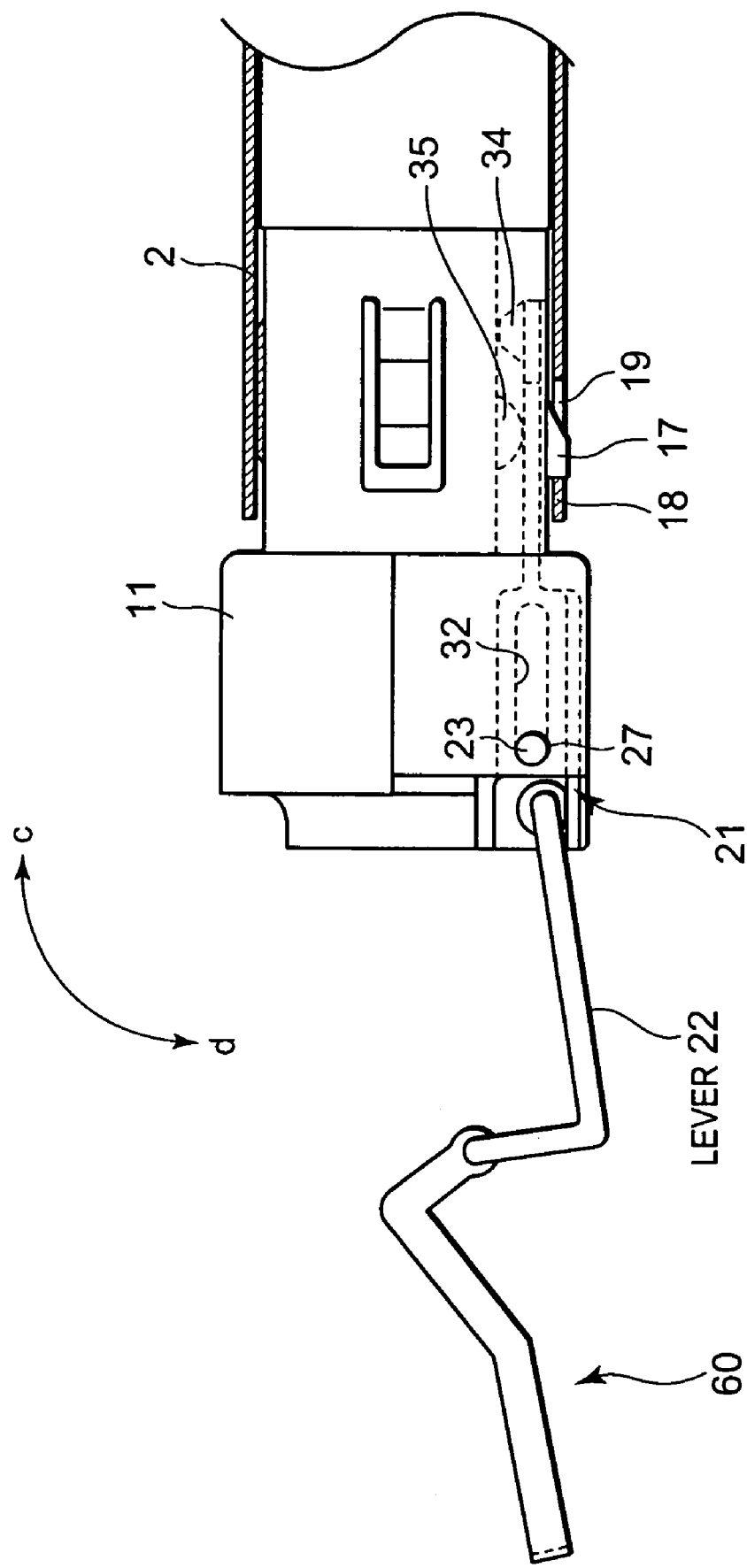
FIG. 31 is a side view of the optical transceiver 4 showing a state in which the lever 22 is turned in a direction of an arrow d of FIG. 30 and projecting to a front side of the case 11.

FIG. 31 is a side view of the optical transceiver 4 showing a state in which the lever 22 is turned in the direction of the arrow d of FIG. 30 and projecting to the front side of the case 11.

In FIG. 31, if the lever 22 is turned in the arrow d direction and the operating member 60 coupled to the lever 22 is placed at the front of the lever 22, the user can easily pull out the case 11 by using the operating member 60.

Figure 32:
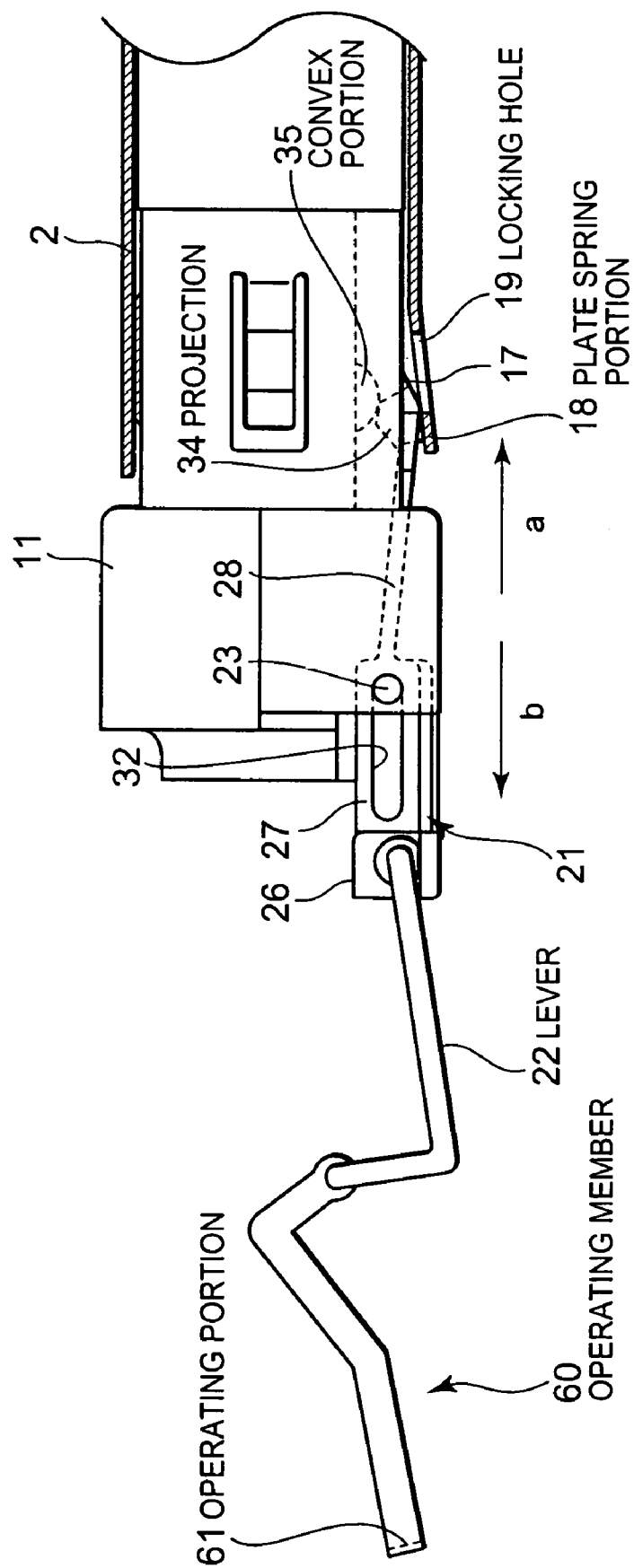
FIG. 32 is a side view of the optical transceiver 4 showing a state in which the an operating portion 61 is pulled in the direction of an arrow b.
Figure 33:
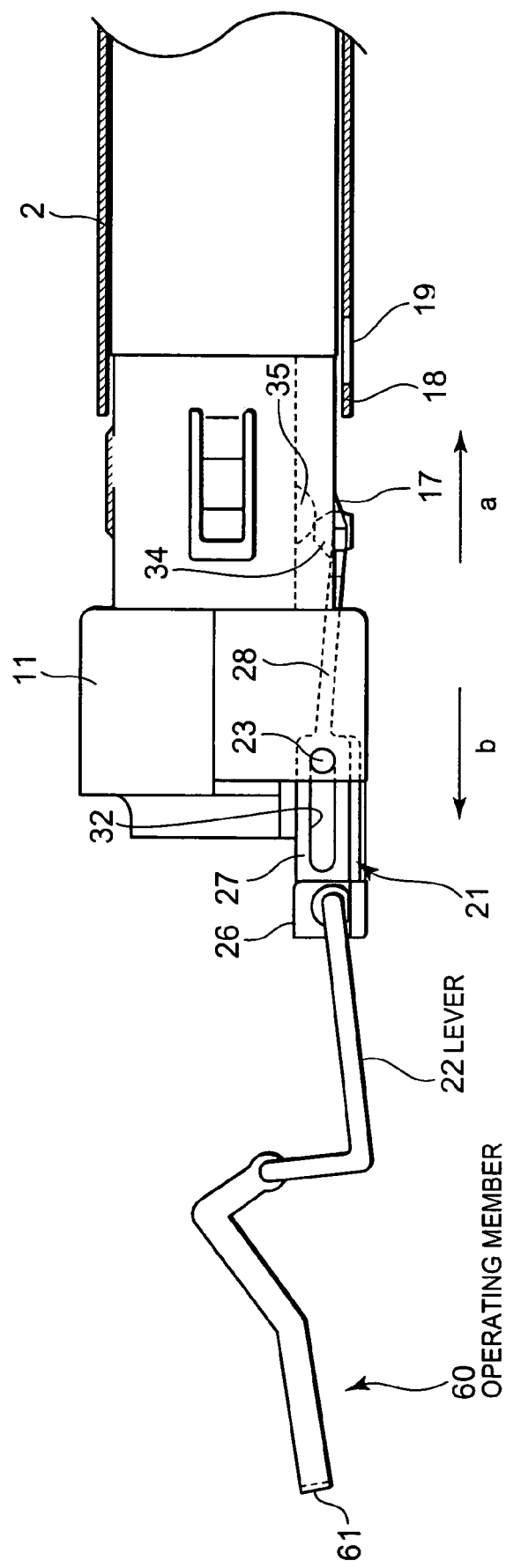
FIG. 33 is a side view of the optical transceiver 4 showing a state in which an operating portion 61 is further pulled in the direction of the arrow b and the case 11 is pulled out of the cage 2.

FIG. 32 is a side view of the optical transceiver 4 showing a state in which the operating portion 61 is pulled in the direction of the arrow b. FIG. 33 is a side view of the optical transceiver 4 showing a state in which the operating portion 61 is further pulled in the direction of the arrow b and the case 11 is pulled out of the cage 2. The description of FIGS. 32 and 33 is the same as that of FIGS. 14 and 15, which will be omitted in order to avoid redundancy. In FIGS. 32 and 33, however, the operating member 60 is positioned at the front of the case 11 of the optical transceiver 4 rather than in a vertical direction thereto. In this case, the operating portion 61 is positioned approximately in the same direction as the direction in which the lever 22 is pulled.

Subsequently, a description will be given as to the operation for pulling the optical transceiver 4 of the present invention out of the cage 2 on the communication apparatus having multiple optical transceivers 4 mounted at a high density thereon.

FIGS. 34A to 35B are diagrams for describing the operation for pulling the optical transceiver 4 of the present invention out of the cage 2 on the communication apparatus having multiple optical transceivers 4 mounted at a high density thereon.

Figure 34A:
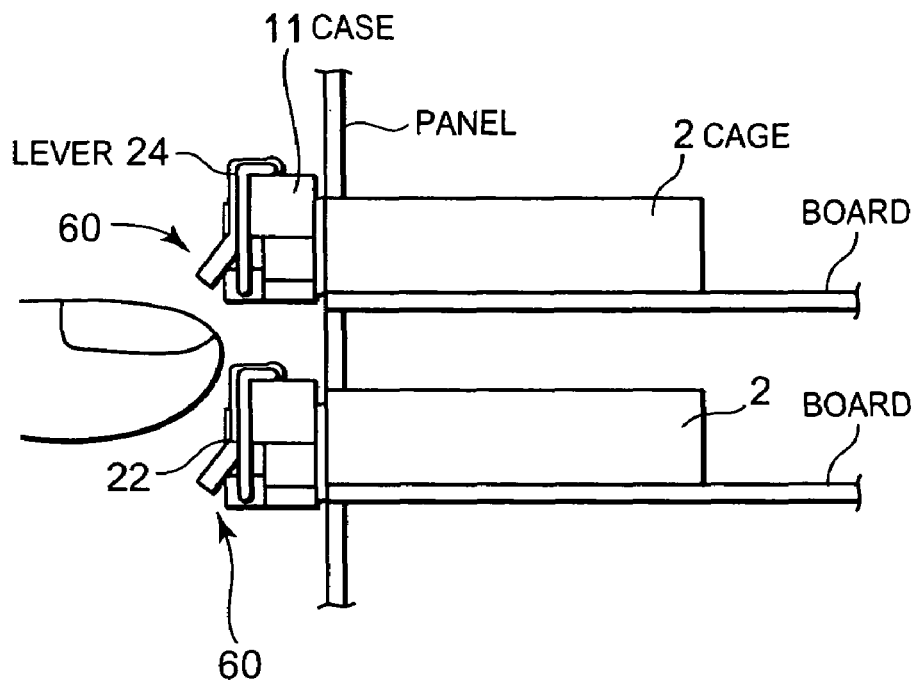
FIGS. 34A to 35B are diagrams for describing operation for pulling the optical transceiver 4 of the present invention out of the cage 2 on the communication apparatus having multiple optical transceivers 4 mounted at a high density thereon.
Figure 34B:
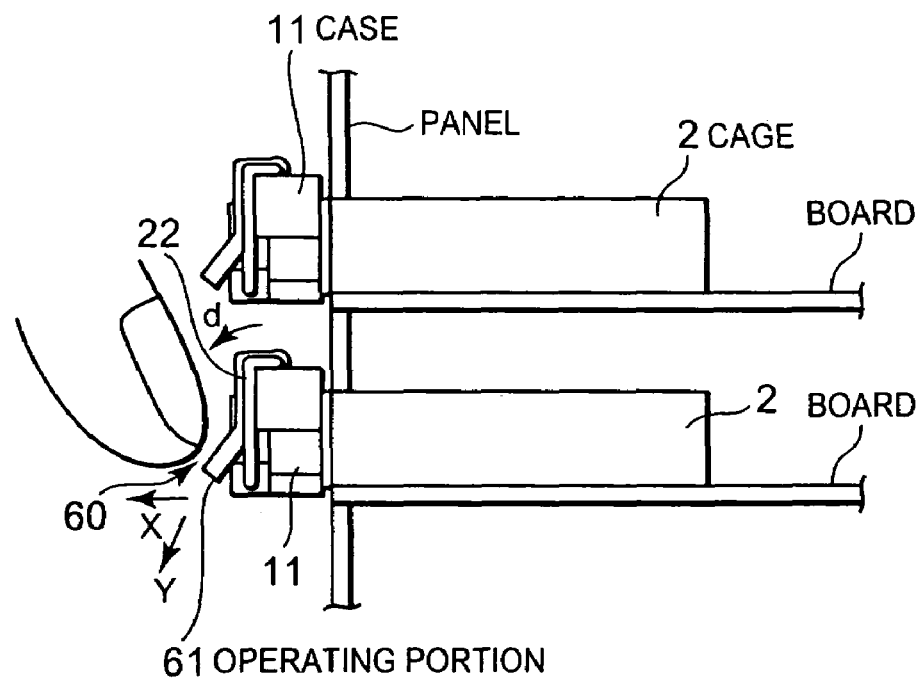

In FIG. 34B, the user can turn the lever 22 in the arrow d direction by pulling the operating member 60 in the X direction. To be more specific, if the user pulls the operating member 60 in the X direction, the lever 22 coupled to the operating member 60 is simultaneously pulled and so the lever 22 turns in the arrow d direction shown in FIGS. 30 and 31. The direction of pulling is not limited to the X direction but may be another direction, such as a Y direction for instance.

Figure 35A:
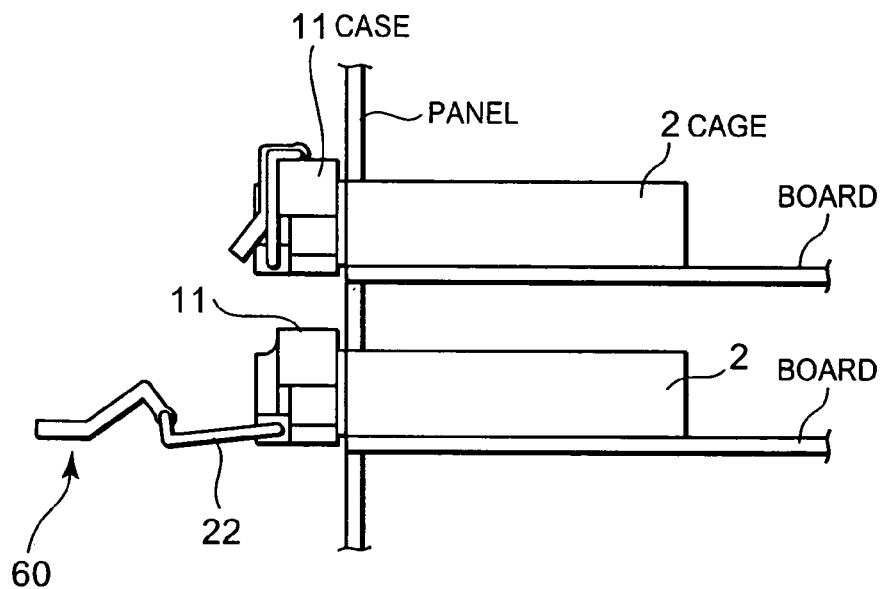
Figure 35B:
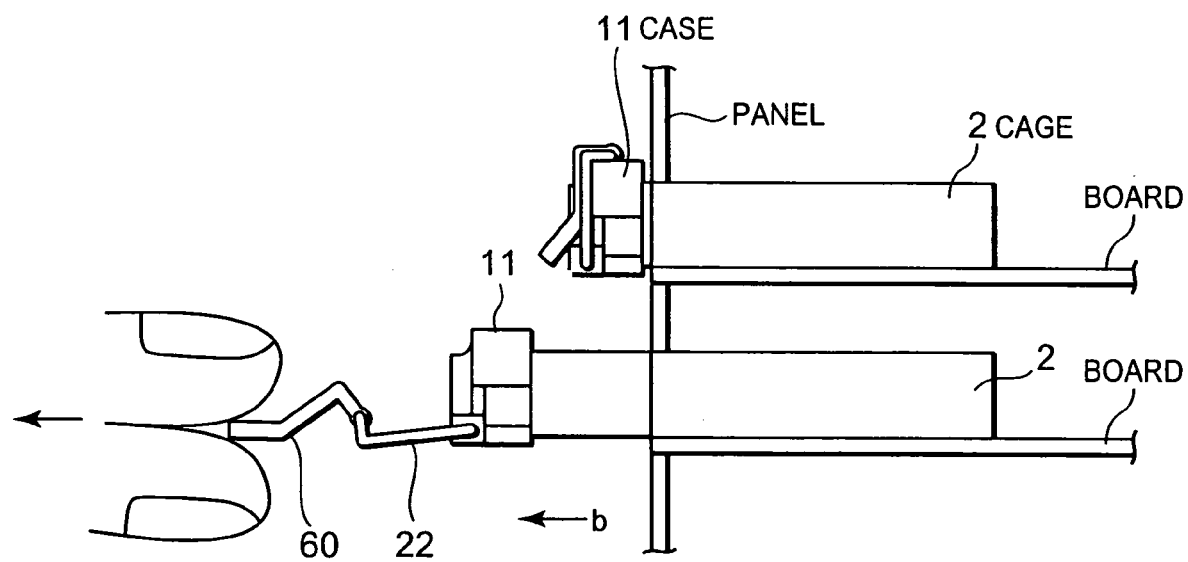

FIG. 35A shows a state in which the operating member 60 is pulled and the lever 22 turns so that both are projecting to the front side of the case 11. Therefore, as shown in FIG. 35B, the user can pull the optical transceiver 4 out of the cage 2 by pulling the operating member 60 projecting to the front side of the case 11 in the arrow b direction.

Thus, according to the optical transceiver 4 of this embodiment, it is possible for the user to turn the lever 22 easily by pulling the operating member 60. For that reason, it is possible to improve operability for the user on the communication apparatus having the multiple optical transceivers 4 mounted thereon which is miniaturized and rendered high-density. According to this embodiment, the user turns the lever 22 by pulling the operating member 60 and releases the lock between the optical transceiver 4 and the cage 2 by further pulling the operating member 60 without moving his or her finger. Therefore, it is no longer necessary for the user to switch as in the case of pulling the optical transceiver 4 out of the cage 2 according to the first and second embodiments. Thus, it can further improve the operability for the user.

Next, a fourth embodiment of the present invention will be described.

Figure 36A:
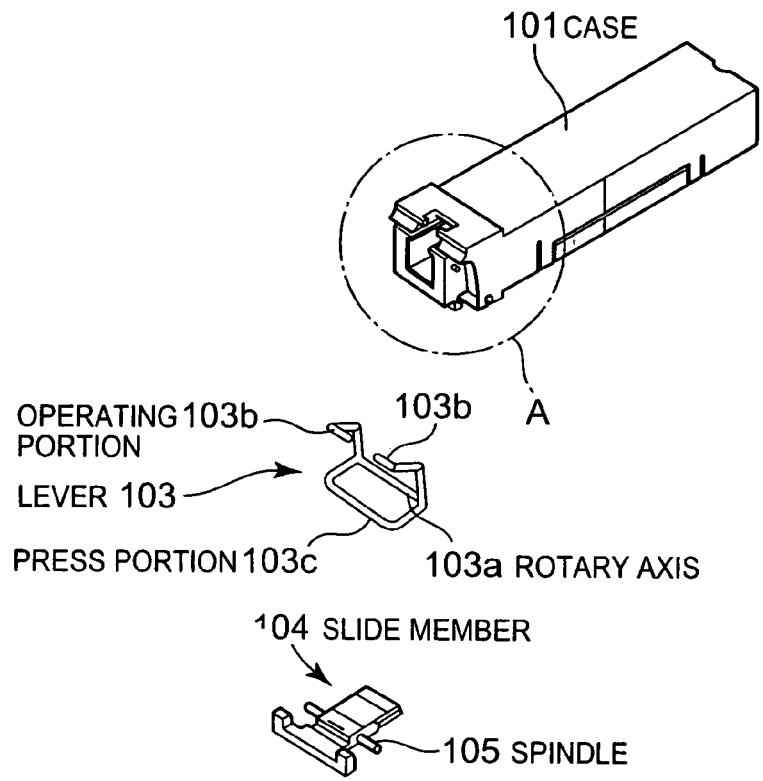
FIG. 36A is perspective views of a case 101 of an optical transceiver 100 as a fourth embodiment of the present invention and a lever 103 and a slide member 104 to be mounted on the case 101.
Figure 36B:
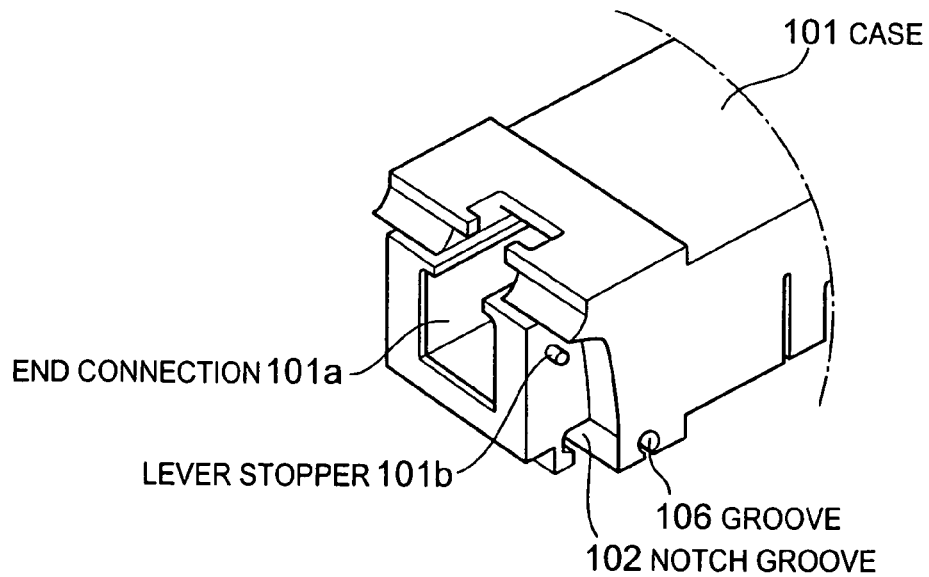
FIG. 36B is an enlarged view of an A portion of the case 101 shown in FIG. 36A.

FIG. 36A is a perspective view showing a case 101, a lever 103 to be mounted on the case 101 and a slide member 104 of an optical transceiver 100 as a fourth embodiment of the present invention. FIG. 36B is an enlarged view of an A portion of the case 101 shown in FIG. 36A.

In FIGS. 36A and 36B, the optical transceiver 100 of this embodiment is comprised of the case 101, the lever 103 to be mounted in the vicinity of the front of the case 101 and the slide member 104.

The lever 103 has a rotary axis 103a, an operating portion 103b provided in the upper portion of the lever 103 and a press portion 103c. If the user places his or her finger on the operating portion 103b and pushes it down, the lever 103 is turned forward with the rotary axis 103a as the axis. The press portion 103c is roughly horseshoe-shaped. The ends of the press portion 103c are connected in proximity to both ends of the rotary axis 103a of the lever 103. The press portion 103c is positioned anterior to the front end face of the case 101 and lower than the area anterior to the end connection 101a of the case 101. The case 101 has a notch groove 102 and a groove 106 provided on the front thereof. The notch groove 102 has the rotary axis 103a of the lever 103 set therein, and the groove 106 has a spindle 105 of the slide member 104 set therein.

The case 101 also has lever stoppers 101b formed on both anterior sides, where bilateral portions of the lever 103 are locked on the lever stoppers 101b so that the lever 103 is fixed at a predetermined position of the case 101. The lever 103 and slide member 104 are mounted on the case 101 as follows. First, the rotary axis 103a of the lever 103 is set in the notch groove 102 of the case 101. Next, the spindle 105 of the slide member 104 is set in the groove 106 of the case 101 as if sandwiching the rotary axis 103a of the lever 103 between the case 101 and the slide member 104. Thus, the lever 103 turns centering on the rotary axis 103a supported in the notch groove 102, and the slide member 104 can swing centering on the spindle 105 supported in the groove 106.

The case 101 of the optical transceiver 100 has various unshown optical elements which are the communication means for performing the optical communication built therein. For instance, it includes the optical unit having the optical elements such as the LD as the light-emitting element and the PD or lens as the light-sensitive element. The end connection 101a is formed astride the front end face and the ceiling face of the case 101, and the connector plug of the optical fiber cable not shown is detachably connected to the end connection 101a.

The operating portion 103b is comprised of a first part and a second part, and has a gap between them. This is intended, on connecting the connector plug of the optical fiber cable to the end connection 101a, to avoid it from blocking movement of the lever 103.

Figures 37A, 37B:
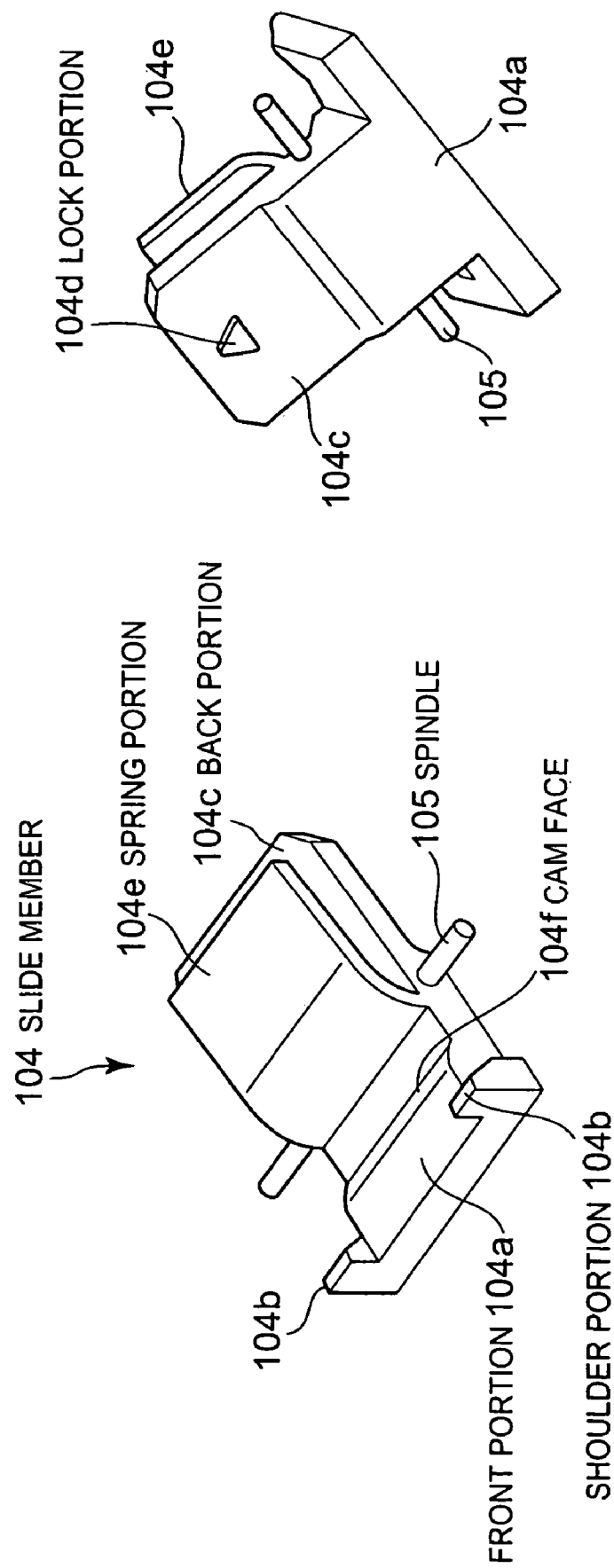
FIG. 37A is a perspective view showing an upside of the slide member 104 shown in FIG. 36A.
FIG. 37B is a perspective view showing a downside of the slide member 104 shown in FIG. 36A.

Next, a description will be given by referring to FIGS. 37A and 37B as to detailed configuration of the slide member 104. FIG. 37A is a perspective view showing an upside of the slide member 104 shown in FIG. 36A. In FIG. 37A, the slide member 104 has a front portion 104a and a back portion 104c. The front portion 104a has a cam face 104f of which height becomes higher from the spindle 105 to the front end of the front portion 104a formed on a top face thereof. The front portion 104a also has shoulder portions 104b provided on both sides of the front end thereof. If the lever 103 shown in FIG. 36A turns and projects to the front of the case 101, the press portion 103c of the lever 103 abuts the shoulder portions 104b. Above the back portion 104c, a spring portion 104e as energizing means extends almost in parallel with the top face of the back portion 104c. One end of the spring portion 104e is fixed approximately at the center of the top face of the slide member 104.

The slide member 104 is integrally mold-formed with the spindle 105 for instance. The resin such as PPS is used as a material thereof for instance. Otherwise, it is also possible, after the portions of the slide member 104 other than the spring portion 104e are integrally formed with the resin such as PPS, to mount the spring portion 104e on that molding. In the latter case, it is possible, as to the material of the spring portion 104e, to use a material different from that of the portions other than the spring portion 104e. For instance, only the spring portion 104e may be configured by metal.

FIG. 37B is a perspective view showing a downside of the slide member 104 shown in FIG. 36A. In FIG. 37B, a projection-like lock portion 104d is provided on the bottom face of the back portion 104c of the slide member 104. The lock portion 104d and a locking hole 110a described later are locked so that the case 101 of the optical transceiver 100 is locked in the cage 110.

Figure 38:
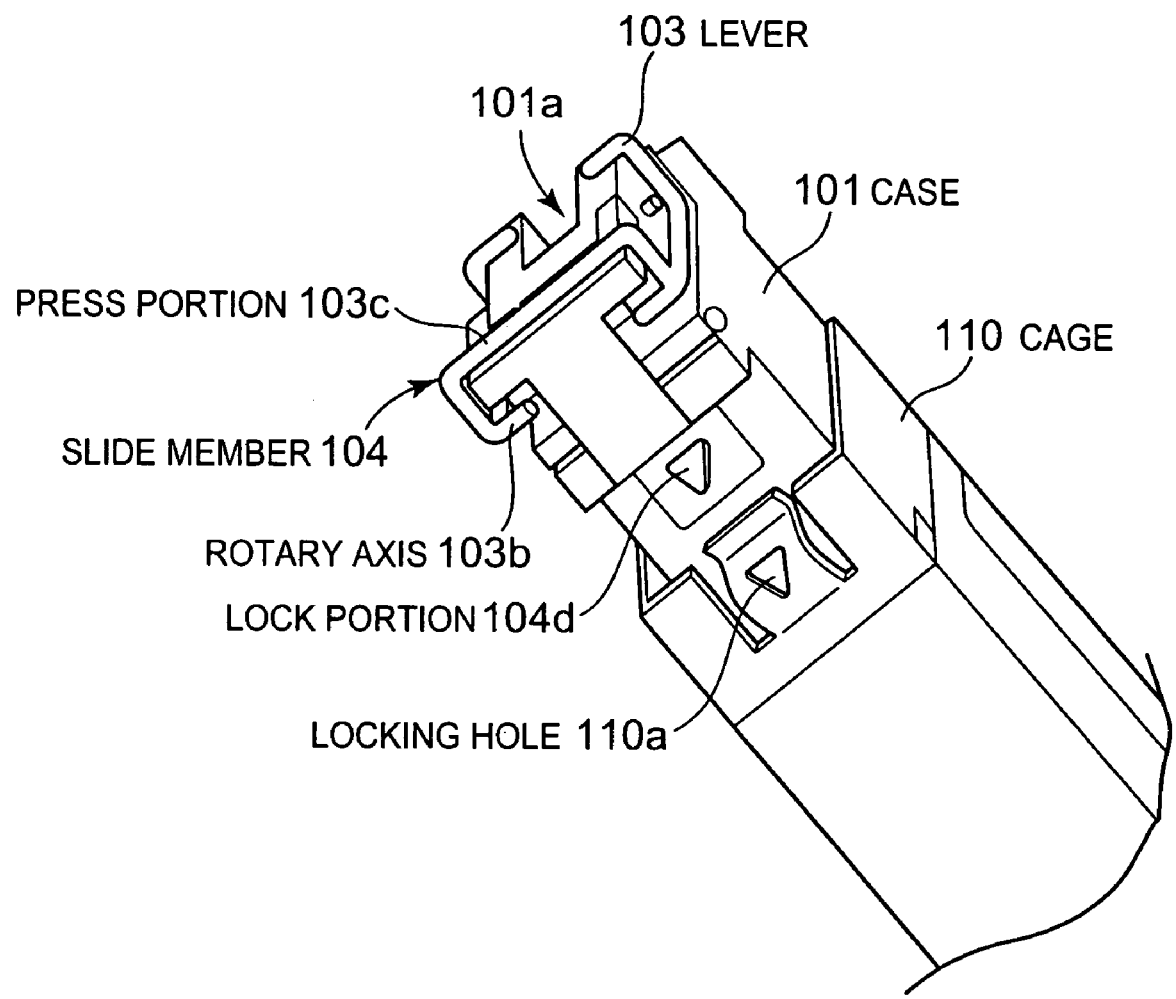
FIG. 38 is a perspective view showing a state in which the case 101 of the optical transceiver 100 shown in FIGS. 36A and 36B is pulled out of a cage 110.

FIG. 38 is a perspective view showing a state in which the case 101 of the optical transceiver 100 shown in FIGS. 36A and 36B is inserted in the cage 110. In FIG. 38, the locking hole 110a is provided on the bottom face of the cage 110. The locking hole 110a is placed at the position to be locked by the lock portion 104d of the slide member 104 when the case 101 is inserted in the cage 110.

The cage 110 and case 101 are configured, for instance, by bending the metal plate such as stainless used steel. The case 101 is configured with a mold-formed resin such as PPS for instance as with the slide member 104. The lever 103 is formed with the metal such as stainless or the resin material such as PPS for instance.

Figure 39:
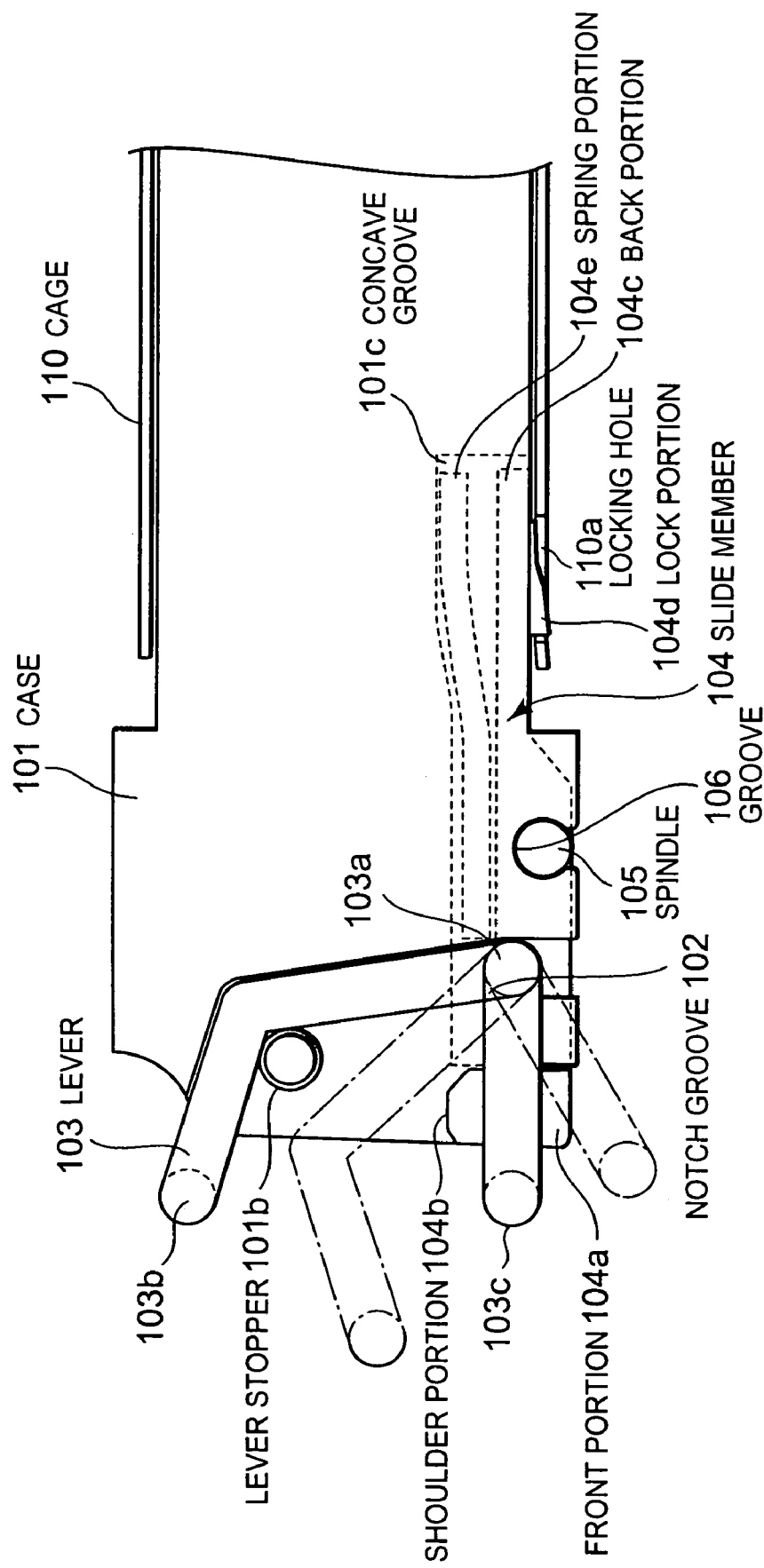
FIG. 39 is a side view of the optical transceiver 100 showing a state in which the case 101 of the optical transceiver 100 as the fourth embodiment is locked onto the cage 110.
Figure 40:
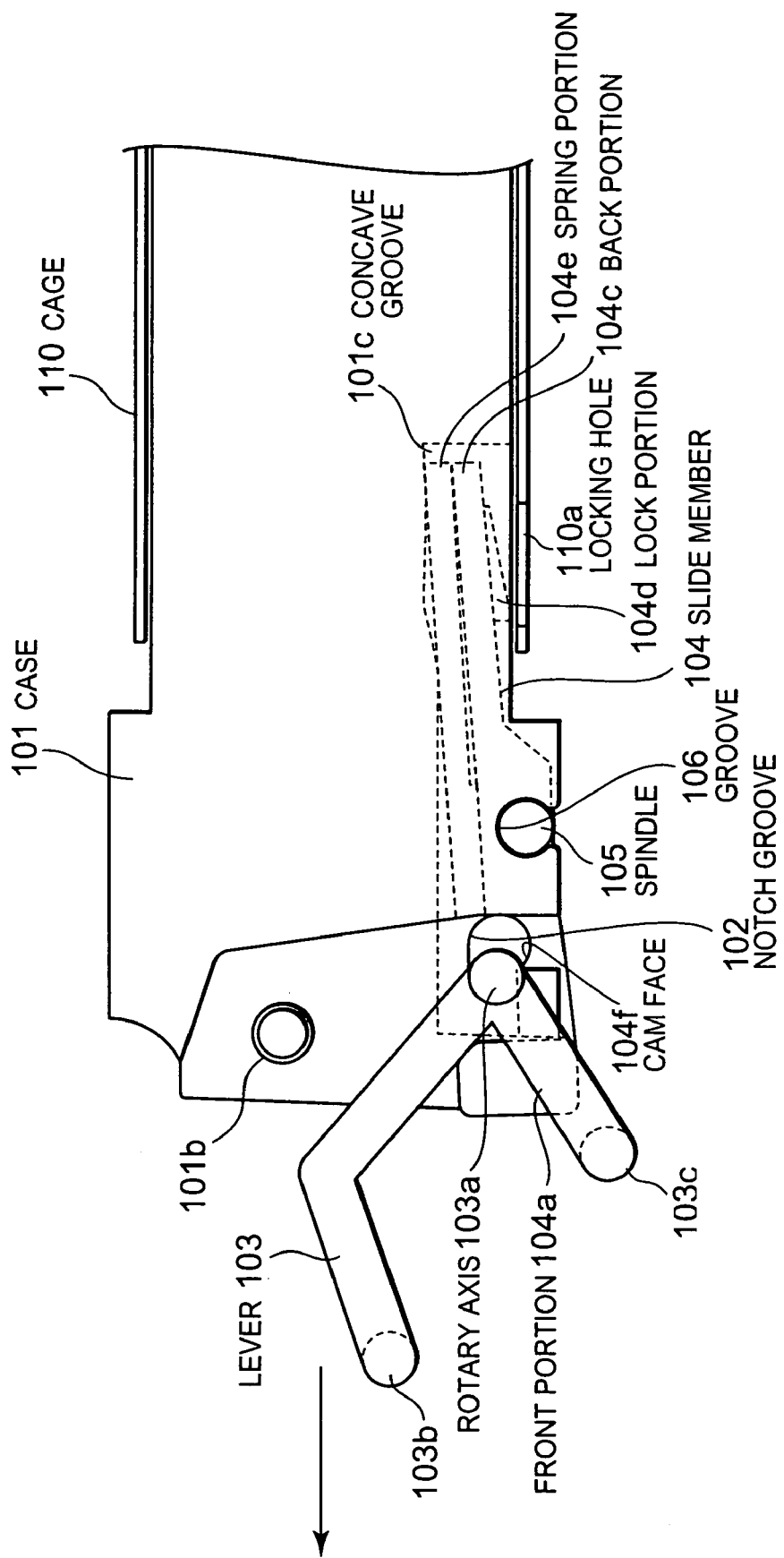
FIG. 40 is a side view of the optical transceiver 100 showing a state in which the lock between the case 101 of the optical transceiver 100 as the fourth embodiment and the cage 110 is released.

Subsequently, a description will be given by referring to FIGS. 39 and 40 as to the operation for releasing the lock between the case 101 and the cage 110. In FIGS. 39 and 40, the portion hidden in the case 101 of the slide member 104 is shown in broken line.

FIG. 39 is a side view of the optical transceiver 100 showing a state in which the case 101 of the optical transceiver 100 is locked in the cage 110 according to a fourth embodiment. FIG. 40 is a side view of the optical transceiver 100 showing a state in which the lock between the case 101 and the cage 110 of the optical transceiver 100 of the fourth embodiment is released. In FIG. 39, the slide member 104 keeps a parallel posture to the case 101, and the lock portion 104d of the slide member 104 is locked in the locking hole 110a of the cage 110. The rotary axis 103a of the lever 103 is positioned on the back end side of the notch groove 102. The rotary axis 103a is at the lowest position of the cam face 104f formed on the front portion 104a of the slide member 104. If the lever 103 is turned and the lock of the lever 103 by the lever stoppers 10b is released, the lever 103 turns centering on the rotary axis 103a positioned on the back end side of the notch groove 102 so as to project to the front of the case 101 as shown in dashed line. The lever 103 is turned to the front of the case 101 by the user placing his or her finger on the operating portion 103b. However, it may also be turned by the user pushing down the press portion 103c.

If the lever 103 is pulled out of the lever stoppers 101b, it may be automatically turned to a position to be easily held.

Even in the case where the user gets his or her finger holding the lever 103 off the lever 103 while pulling out the optical transceiver 100, the lever 103 remains projected to the front of the case 101 without returning to its original state shown in full line in FIG. 39 so that the user should hold the lever 103 again.

If the user holds the lever 103 and pulls it in the direction of the arrow shown in FIG. 40 in the state in which the lever 103 is turned to the front of the case 101, the rotary axis 103a of the lever 103 moves from the lowest position of the cam face 104f to the position abutting the front end of the notch groove 102. In this case, the rotary axis 103a pushes down the cam face 104f formed on the front portion 104a of the slide member 104. If the cam face 104f is pushed down, the slide member 104 swings centering on the spindle 105 in the groove 106 so that the spring portion 104e and the back portion 104c are heaved upward. The spring portion 104e heaved upward abuts a concave groove 101c formed on the bottom face of the case 101 and sags, and the lock portion 104d on the bottom face of the back portion 104c comes off the locking hole 110a of the cage 110. Thus, the lock between the case 101 and the cage 110 is released. While the lever 103 is pulled to the front of the case 101, the slide member 104 is held in an inclined state and so the lock between the case 101 and the cage 110 is continuously released. Therefore, the user can pull the lever 103 to the front of the case 101 from the state in which the lever 103 is turned so as to pull the case 101 of the optical transceiver 100 out of the cage 110.

If the user stops pulling the lever 103 to the front of the case 101, the back portion 104c of the slide member 104 is pushed down by restoring force of the spring portion 104e which was sagging till then, and the slide member 104 tries to swing in the opposite direction to the direction for releasing the lock centering on the spindle 105. In this case, the rotary axis 103a of the lever 103 is pushed backward in the notch groove 102 along the cam face 104f so as to abut the back end in the notch groove 102 after a while. If the rotary axis 103a of the lever 103 abuts the back end in the notch groove 102, the slide member 104 returns to the original parallel posture to the case 101 shown in FIG. 39.

If the lever 103 is turned in the state in which the connector plug not shown is connected to the end connection 101a, the operating portion 103b of the lever 103 abuts the connector plug so that the lever 103 is not turned at least up to the position shown in FIG. 40. To be more specific, even if unexpected external force arises to the lever 103, the lever 103 is turned only up to the position to abut the connector plug so that the lock portion 104d does not come off the locking hole 110a. For that reason, it is possible to prevent the case 101 of the optical transceiver 100 from being pulled out of the cage 110 by mistake while the optical transceiver 100 is performing communication. Thus, it is possible to prevent an interruption in the communication and a failure of the optical transceiver 100.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A mechanism for releasing a lock between an optical transceiver and a cage, comprising:
   a turning means mounted on the optical transceiver and turning centering on a predetermined axis;
   a finger placing portion provided on said turning means;
   an operating means for working with and turning the turning means;
   a sliding means for sliding from a first position to a second position when said finger placing portion is pulled out; and
   a lock releasing means for releasing the lock due to the sliding of said sliding means,
   wherein a part of said operating means protrudes from a front side of said optical transceiver when said optical transceiver and said cage are locked, and said turning means is turned by pressing said part.

2. The mechanism as claimed in claim 1, further comprising:
   a spindle provided on said optical transceiver; and
   a hole provided on said sliding means for receiving said spindle,
   wherein said spindle moves in said hole.

3. The mechanism as claimed in claim 2, wherein said pressing means is mounted on the turning means.

4. The mechanism as claimed in claim 3, wherein said pressing means is mounted almost vertically on the turning means.

5. The mechanism as claimed in claim 4, wherein said pressing means exists below the optical transceiver in a state in which the turning means is turned.

6. The mechanism as claimed in claim 2, wherein said pressing means and the turning means are integrally formed.

7. The mechanism as claimed in claim 1, wherein said operating means is pulling means for turning the turning means by a pulling.

8. The mechanism as claimed in claim 7, wherein said pulling means is mounted on the turning means.

9. The mechanism as claimed in claim 8, wherein said pulling means is rotatably mounted on the turning means.

10. The mechanism as claimed in claim 1 further comprises an elastic means formed on a predetermined face of the cage and including a first locking means.

11. The mechanism as claimed in claim 10, further comprising:
a concave portion formed on a predetermined face of the optical transceiver; and
a second locking means provided on the concave portion,
wherein said lock releasing means releases the lock between the first locking means and the second locking means by means of the move.

12. The mechanism as claimed in claim 11, wherein, the sliding means is mounted on the turning means and at least partially accommodated in the concave portion and sliding along with the move.

13. The mechanism as claimed in claim 12, further comprising:
a first convex portion formed on the concave portion; and
a second convex portion provided on the sliding means,
wherein said second convex portion abuts on said first convex portion and displaces said elastic means when said sliding means is slid so that the lock between the first locking means and the second locking means can be released.

14. The mechanism as claimed in claim 10, further comprising:
a swing means for being swung centering on the predetermined axis by turning of the turning means; and
a second locking means formed on one face of the swing means,
wherein said lock releasing means has the lock between the first locking means and the second locking means released by swinging of the swing means.

15. An optical transceiver for releasing a lock with a cage, comprising:
a turning means for turning centering on a predetermined axis;
a finger placing portion provide on said turning means;
an operating means for working with and turning the turning means;
a sliding means for sliding from a first position to a second position when said finger placing portion is pulled out; and
a lock releasing means for releasing the lock due to the sliding of said sliding means,
wherein a part of said operating means protrudes from a front side of said optical transceiver when said optical transceiver and said cage arc locked, and said turning means is turned by pressing said part.

16. The optical transceiver as claimed in claim 15, further comprising:
a spindle provided on said optical transceiver; and
a hole provided on said sliding means for receiving said spindle,
wherein said spindle moves in said hole.

17. The optical transceiver as claimed in claim 15, wherein said operating means is a pulling means for turning the turning means by pulling.

18. The optical transceiver as claimed in claim 15, further comprising:
a concave portion formed on a predetermined face;
a first convex portion formed on the concave portion;
sliding means mounted on the turning means, at least partially accommodated in the concave portion and sliding along with the move; and
a second convex portion provided on the sliding means,
wherein said lock releasing means has the lock released by abutting of the first and second convex portions due to the move of the turning means.

19. The optical transceiver as claimed in claim 15, further comprising:
a swing means for being swung centering on the predetermined axis by turning of the turning means, wherein said lock releasing means has the lock released by swinging of the swing means.

20. A communication apparatus including a board having at least one cage mounted thereon with an optical transceiver locked in the cage, comprising:
a turning means mounted on the optical transceiver and turning centering on a predetermined axis;
a finger placing portion provided on said turning means;
an operating means for working with and turning the turning means;
a sliding means for sliding from a first position to a second position when said finger placing portion is pulled out; and
a lock releasing means for releasing the lock due to the sliding of said sliding means,
wherein a part of said operating means protrudes from a front side of said optical transceiver when said optical transceiver and said cage are locked, and said turning means is turned by pressing said part.

21. A mechanism for releasing a lock between an optical transceiver and a cage, comprising:
a lever mounted on the optical transceiver and turning centering on a predetermined axis;
a finger placing portion provided on said lever;
an operating member for working with and turning the lever;
a sliding member for sliding from a first position to a second position when said finger placing portion is pulled out; and
a lock releasing mechanism for releasing the lock due to the sliding of said sliding means
wherein a part of said operating means protrudes from a front side of said optical transceiver when said optical transceiver and said cage are locked, and said lever is turned by pressing said part.

22. The mechanism as claimed in claim 21, further comprising:
a spindle provided on said optical transceiver; and
a hole provided on said sliding means for receiving said spindle,
wherein said spindle moves in said hole.

23. The mechanism as claimed in claim 22, wherein said operating member is mounted on the lever.

24. The mechanism as claimed in claim 23, wherein said operating member is mounted almost vertically on the lever.

25. The mechanism as claimed in claim 24, wherein said operating member exists below the optical transceiver in a state in which the lever is turned.

26. The mechanism as claimed in claim 22, wherein said operating member and the lever are integrally formed.

27. The mechanism as claimed in claim 21, wherein said operating member turns the lever by pulling.

28. The mechanism as claimed in claim 27, wherein said operating member is mounted on the lever.

29. The mechanism as claimed in claim 28, wherein said operating member is rotatably mounted on the lever.

30. The mechanism as claimed in claim 21, farther comprises a plate spring portion formed on a predetermined face of the cage and including a locking hole.

31. The mechanism as claimed in claim 30, further comprising:
 a concave portion formed on a predetermined face of the optical transceiver; and
 a lock portion provided on the concave portion,
 wherein said lock releasing mechanism releases the lock between the lock portion and the locking hole by means of the move.

32. The mechanism as claimed in claim 31, wherein the slide member is mounted on the lever, at least partially accommodated in the concave portion and sliding along with the move.

33. The mechanism as claimed in claim 32, further comprising:
 a first convex portion formed on the concave portion; and
 a second convex portion provided on the slide member,
 wherein said second convex portion abuts on said first convex portion and replaces said plate spring portion when said sliding means is slid so that the lock between the lock portion and the locking hole can be released.

34. The mechanism as claimed in claim 30, further comprising:
 a swing member for being swung centering on the predetermined axis by turning of the lever; and
 a lock portion formed on one face of the swing member,
 wherein said lock releasing mechanism has the lock between the lock portion and the locking hole released by swinging of the swing member.

35. An optical transceiver for releasing a lock with a cage, comprising:
 a lever for turning centering on a predetermined axis;
 a finger placing portion provided on the lever;
 an operating member for working with and turning the lever;
 a sliding means for sliding from a first position to a second position when said finger placing portion is pulled out; and
 a lock releasing mechanism for releasing the lock due to the sliding of said sliding means
 wherein a part of said operating means protrudes from a front side of said optical transceiver when said optical transceiver and said cage are locked, said lever is turned by pressing said part.

36. The optical transceiver as claimed in claim 35, further comprising:
 a spindle provided on said optical transceiver; and
 a hole provided on said sliding means for receiving said spindle,
 wherein said spindle moves in said hole.

37. The optical transceiver as claimed in claim 35, further comprising:
 a concave portion formed on a predetermined face;
 a first convex portion formed on the concave portion;
 a slide member mounted on the lever, at least partially accommodated in the concave portion and sliding along with the move, and
 a second convex portion provided on the slide member,
 wherein said lock releasing mechanism has the lock released by abutting of the first and second convex portions due to the move of the lever.

38. The optical transceiver as claimed in claim 35, further comprising:
 a swing member for being swung centering on the predetermined axis by turning of the lever,
 wherein said lock releasing mechanism has the lock released by swinging of the swing member.

39. The optical transceiver as claimed in claim 35, wherein said operating member turns the lever by pulling.

40. A communication apparatus including a board having at least one cage mounted thereon with the optical transceiver locked in the cage, comprising:
 a lever mounted on the optical transceiver and turning centering on a predetermined axis;
 a finger placing portion provided on the lever;
 an operating member for working with and turning the lever;
 a sliding means for sliding from a first position to a second position when said finger placing portion is pulled out; and
 a lock releasing mechanism for releasing the lock between the optical transceiver and the cage due to the sliding of said sliding means,
 wherein a part of said operating means protrudes from a front side of said optical transceiver when said optical transceiver and said cage are locked, said lever is turned by pressing said part.

41. A method of releasing a lock between an optical transceiver and a cage, comprising:
 pressing a part of an operating member provided to the optical transceiver, said part protruding from a front side of said optical transceiver;
 working with operation of the operating member and turning a lever;
 pulling out a finger placing portion provided on said lever;
 sliding a sliding means provided to said optical transceiver from a first position to a second position by pulling out said finger placing portion; and
 releasing the lock.

42. The method as claimed in claim 41, further comprising the steps of:
 providing a spindle provided on said optical transceiver;
 providing a hole on said sliding means for receiving said spindle; and
 moving said spindle in said hole.

43. The method as claimed in claim 41, wherein said operating step comprises pulling the operating member provided on the optical transceiver.

44. The method as claimed in claim 41, further comprising:
 causing a convex portion formed on a slide member and sliding along with the move of the lever to abut the convex portion formed on the predetermined face of the optical transceiver; and
 elastically displacing a plate spring portion formed on the predetermined face of the cage,
 wherein said releasing step releases the lock between the lock portion formed on the predetermined face and a locking hole provided on the plate spring portion.

45. The method as claimed in claim 41, further comprising:
 swinging a swing member mounted on the lever centering on a predetermined axis,
 wherein said releasing step releases the lock between the lock portion formed on the swing member and the locking hole provided on the cage.

* * * * *